United States Patent
Min et al.

(10) Patent No.: US 12,126,434 B2
(45) Date of Patent: Oct. 22, 2024

(54) APPARATUS AND METHOD FOR CONTROLLING NETWORK FOR DATA COMMUNICATION IN ELECTRONIC DEVICE

(71) Applicant: Samsung Electronics Co., Ltd., Gyeonggi-do (KR)

(72) Inventors: Hyunkee Min, Gyeonggi-do (KR); Doosuk Kang, Gyeonggi-do (KR); Jihoon Sung, Gyeonggi-do (KR); Sunkee Lee, Gyeonggi-do (KR); Junghun Lee, Gyeonggi-do (KR); Junsu Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 669 days.

(21) Appl. No.: 17/435,513

(22) PCT Filed: Jul. 23, 2021

(86) PCT No.: PCT/KR2021/009568
§ 371 (c)(1),
(2) Date: Sep. 1, 2021

(87) PCT Pub. No.: WO2022/030836
PCT Pub. Date: Feb. 10, 2022

(65) Prior Publication Data
US 2023/0020265 A1     Jan. 19, 2023

(30) Foreign Application Priority Data

Aug. 4, 2020  (KR) .................. 10-2020-0097120

(51) Int. Cl.
*H04W 48/18* (2009.01)
*H04L 1/00* (2006.01)
(Continued)

(52) U.S. Cl.
CPC ....... *H04L 1/0018* (2013.01); *H04W 28/0252* (2013.01); *H04W 28/20* (2013.01);
(Continued)

(58) Field of Classification Search
None
See application file for complete search history.

(56) References Cited

U.S. PATENT DOCUMENTS 8,711,818 B2  4/2014 Rajappan et al.
10,306,179 B2  5/2019 Byun et al.
(Continued)

FOREIGN PATENT DOCUMENTS

CN  109068328 A  12/2018
CN  110191461 A  8/2019
(Continued)

OTHER PUBLICATIONS

European Search Report dated Dec. 7, 2023.
International Search Report dated Oct. 27, 2021.

*Primary Examiner* — Robert M Morlan
(74) *Attorney, Agent, or Firm* — Cha & Reiter, LLC

(57) ABSTRACT

Various embodiments disclose a method and an apparatus for controlling a network for low latency and low power data communication in a tethered AR system. An electronic device according to various embodiments may include a wireless communication circuit; and a processor operatively connected to the wireless communication circuit, wherein the processor is configured to identify a first Service Period (SP), based on a data amount of a predetermined data path when an Augmented Reality (AR) service with an external device is initiated, identify a transmission interval on the basis of a frame rate of the external device, identify whether a network connected to the electronic device satisfies a predetermined transmission requirement, based on at least the first SP and the transmission interval, determine con-
(Continued)

nection information related to a connection with the eternal device on the basis of a network which satisfies the transmission requirement, and make the connection with the external device on the basis of the connection information. Various embodiments are possible.

15 Claims, 18 Drawing Sheets

(51) Int. Cl.
*H04W 28/02* (2009.01)
*H04W 28/20* (2009.01)
*H04W 52/02* (2009.01)
*H04L 67/131* (2022.01)

(52) U.S. Cl.
CPC ....... *H04W 48/18* (2013.01); *H04W 52/0248* (2013.01); *H04L 67/131* (2022.05)

(56) References Cited

U.S. PATENT DOCUMENTS

| | | | |
|---|---|---|---|
| 2007/0206534 A1* | 9/2007 | Kwun | ................. H04L 1/0009 370/329 |
| 2013/0272121 A1 | 10/2013 | Stanwood et al. | |
| 2014/0349745 A1 | 11/2014 | Russo et al. | |
| 2015/0189592 A1 | 7/2015 | Jafarian et al. | |
| 2016/0219510 A1 | 7/2016 | Asterjadhi et al. | |
| 2018/0027020 A1* | 1/2018 | Pallas | ................. H04L 12/4641 726/1 |
| 2019/0313160 A1 | 10/2019 | Stokking et al. | |
| 2021/0120629 A1 | 4/2021 | Choi et al. | |
| 2022/0058465 A1* | 2/2022 | Sen | ........................ G06N 3/044 |

FOREIGN PATENT DOCUMENTS

| | | |
|---|---|---|
| KR | 10-2016-0103050 A | 8/2016 |
| KR | 10-2017-0109555 A | 9/2017 |
| KR | 10-2018-0069576 A | 6/2018 |
| KR | 10-2013729 B1 | 8/2019 |
| KR | 10-2019-0102441 A | 9/2019 |
| KR | 10-2020-0044339 A | 4/2020 |
| WO | 2014/190100 A1 | 11/2014 |
| WO | 2017/052249 A1 | 3/2017 |

* cited by examiner

APPARATUS AND METHOD FOR CONTROLLING NETWORK FOR DATA COMMUNICATION IN ELECTRONIC DEVICE

CROSS REFERENCE TO RELATED APPLICATIONS

This application is a National Phase Entry of PCT International Application No. PCT/KR2021/009568, which was filed on Jul. 23, 2021, and claims a priority to Korean Patent Application No. 10-2020-0097120, which was filed on Aug. 4, 2020, the contents of which are incorporated herein by reference.

TECHNICAL FIELD

Various embodiments of the disclosure relate to a method and an apparatus for controlling a network for data communication with external devices by an electronic device capable of establishing a communication connection with each of the external devices.

BACKGROUND ART

Recent electronic devices provide various services using an Augmented Reality (AR) technology that overlays a three-dimensional virtual object on the real world. The electronic device may include various types of devices, for example, a mobile communication terminal, a smart phone, a tablet Personal Computer (PC), a notebook, a wearable device, and/or AR glasses (or smart glasses). According to an embodiment, AR may be provided through a wearable glass device (for example, AR glasses), a head mounted device (for example, a Head Mounted Display (HMD)), or a smart phone, in which various digital contents may be overlaid on the real world and provided through an application related to an AR service. AR content may be generated by a device providing the AR service, or may be received from another device and provided.

For example, recently, an external device (for example, tethered AR glasses) connected to an electronic device (for example, a smart phone) to display AR content is being developed, and the AR service based on a tethered AR system (or environment) using the external device is being researched and developed. For example, an electronic device (e.g., a smart phone) may be connected to each of AR glasses, and/or a server between the AR glasses and the server (e.g., a cloud) and process data (e.g., images and/or information) that is acquired from the server (e.g., cloud), and the tethered AR system may implement an AR environment through the AR glasses, based on the data processed by the electronic device.

DISCLOSURE OF INVENTION

Technical Problem

In general, a low latency and/or super power-saving method should be used to provide a satisfactory AR experience to a user in a tethered AR system. For example, when a delay of an image reproduced by AR glasses is large, a disconnected image may be displayed to the user. Accordingly, low-latency communication between respective elements (e.g., cloud, electronic device, and/or AR glasses) is desirable in a tethered AR system. In another example, in AR glasses, as the AR glasses are worn by the user, there may be a limitation in a battery capacity while reducing the weight thereof, and it is desirable to reduce current consumption (or a super power-saving method may be needed) to provide an AR service to the user for a long time.

Various embodiments may disclose a method and an apparatus for controlling a network for low latency and low power data communication with external devices (e.g., a server and AR glasses) by an electronic device in a tethered AR system.

Various embodiments may disclose a method and an apparatus for adaptively selecting or changing a network (or a network bearer) based on transmission requirements between an electronic device and an external device (e.g., AR glasses).

Solution to Problem

An electronic device according to various embodiments of the disclosure includes: a wireless communication circuit; and a processor operatively connected to the wireless communication circuit, wherein the processor is configured to identify a first Service Period (SP), based on a data amount of a predetermined data path when an Augmented Reality (AR) service associated with an external device is initiated, identify a transmission interval, based on a frame rate of display on the external device, detect whether a network connected to the electronic device satisfies a predetermined transmission requirement, based on at least the first SP and the transmission interval, determine connection information related to a connection with the external device, based on detecting that the network which satisfies the predetermined transmission requirement, and establish the connection with the external device, based on the connection information.

An electronic device according to an embodiment of the disclosure includes: a wireless communication circuit; and a processor, wherein the processor is configured to detect a connection with an external device through the wireless communication circuit, acquire a data amount of a first link between the electronic device and the external device and a data amount of a second link between the electronic device and a network, calculate a first Service Period (SP) for the first link, based on the data amount of the first link, calculate a second SP of the second link, based on the data amount of the second link, determine a network satisfying an image transmission requirement, based on the first SP and the second SP, and establish a connection with the external device by configuring a channel of the first link to be equal to a channel of the second link, based on the determined network.

A method of operating an electronic device according to an embodiment of the disclosure includes: identifying, by at least one processor of the electronic device, a first Service Period (SP), based on a data amount of a predetermined data path when initiating an Augmented Reality (AR) service with an external device; identifying a transmission interval, based on a frame rate for display of images on the external device; identifying whether a network connected to the electronic device satisfies a predetermined transmission requirement, based on at least the first SP and the transmission interval; determining connection information for a connection with the external device, based on the network satisfying the predetermined transmission requirement; and establishing the connection with the external device, based on the connection information.

In order to solve the above problem, various embodiments of the disclosure may include a computer-readable recording medium that records a program causing a processor to perform the method.

An additional range of applicability of the disclosure may become clear from the following detailed description. However, since various modifications and changes within the idea and scope of the disclosure may be definitely understood by those skilled in the art, the detailed description and specific embodiments such as exemplary embodiments of the disclosure should be understood as only examples.

Advantageous Effects of Invention

An electronic device and a method of operating the same according to various embodiments can perform low latency and/or low power data communication with external devices (e.g., cloud servers and AR glasses), for implementation in a tethered AR system. According to various embodiments, the electronic device controls Service Periods (SPs) to overlap with one another when the electronic device performs communication using different bands, or on different types of network, for a first period and a second period, and controls the SP to avoid overlap when the electronic device performs communication using the same band or the same type of network for the first period and the second period.

BRIEF DESCRIPTION OF DRAWINGS

In connection with description of drawings, the same or similar reference numerals may be used for the same or similar elements.

MODE FOR THE INVENTION

Figure 1:
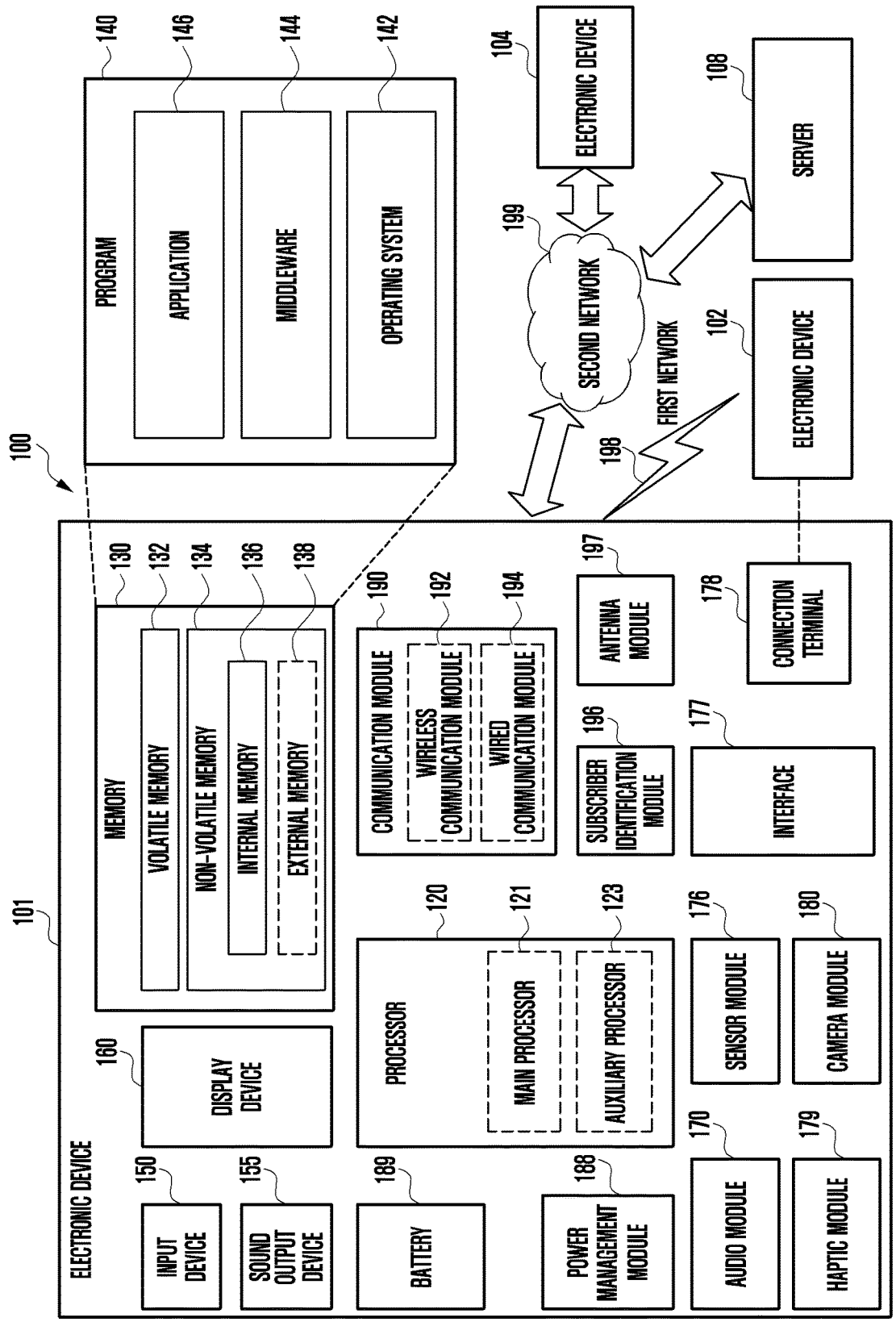
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
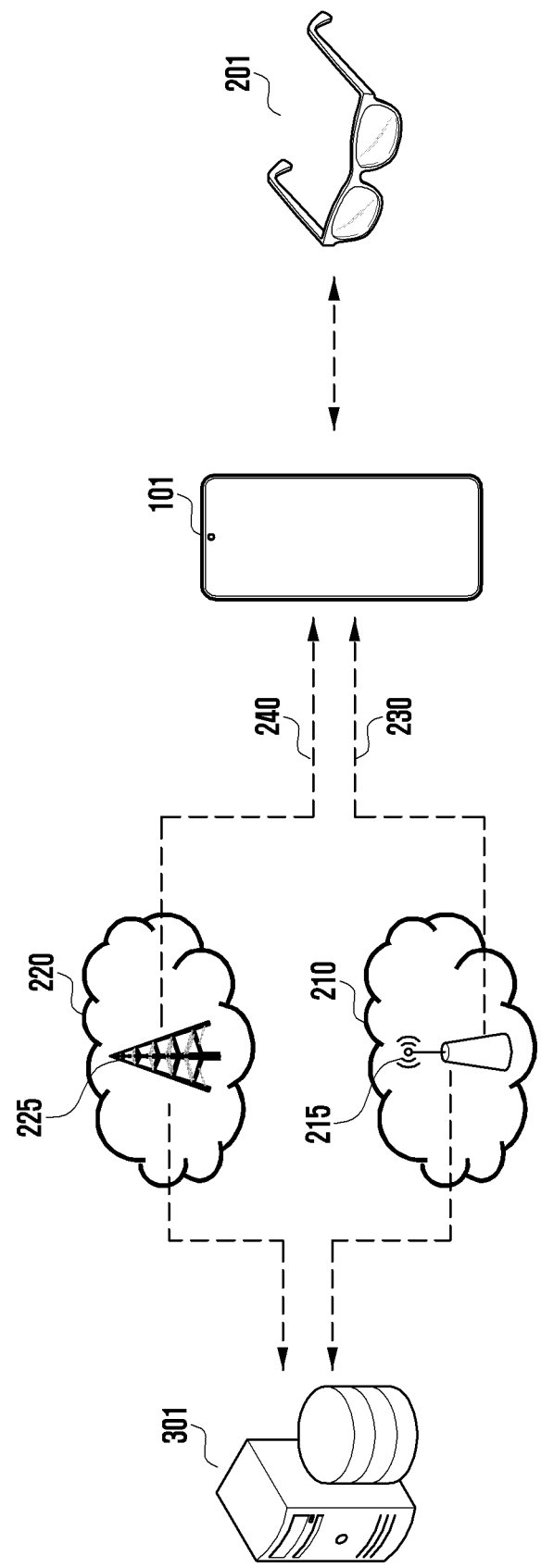
FIGS. 2A, 2B, and 2C illustrate examples of an AR system supporting an AR service according to various embodiments.
Figure 2B:
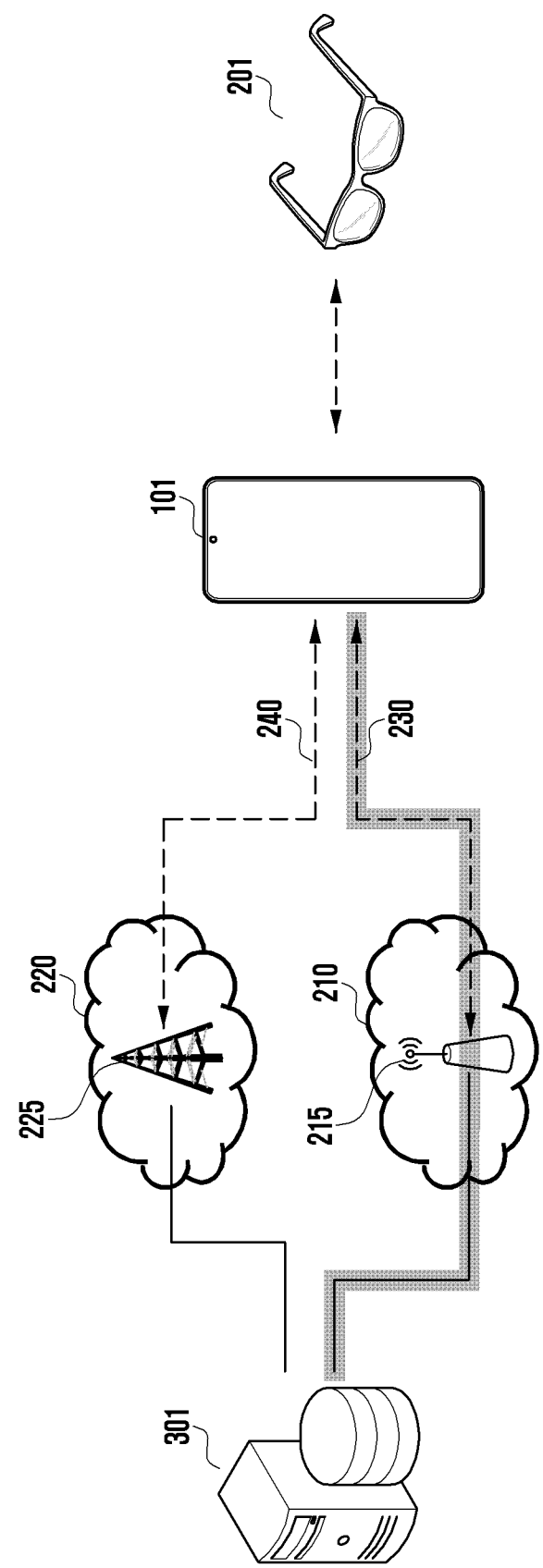
Figure 2C:
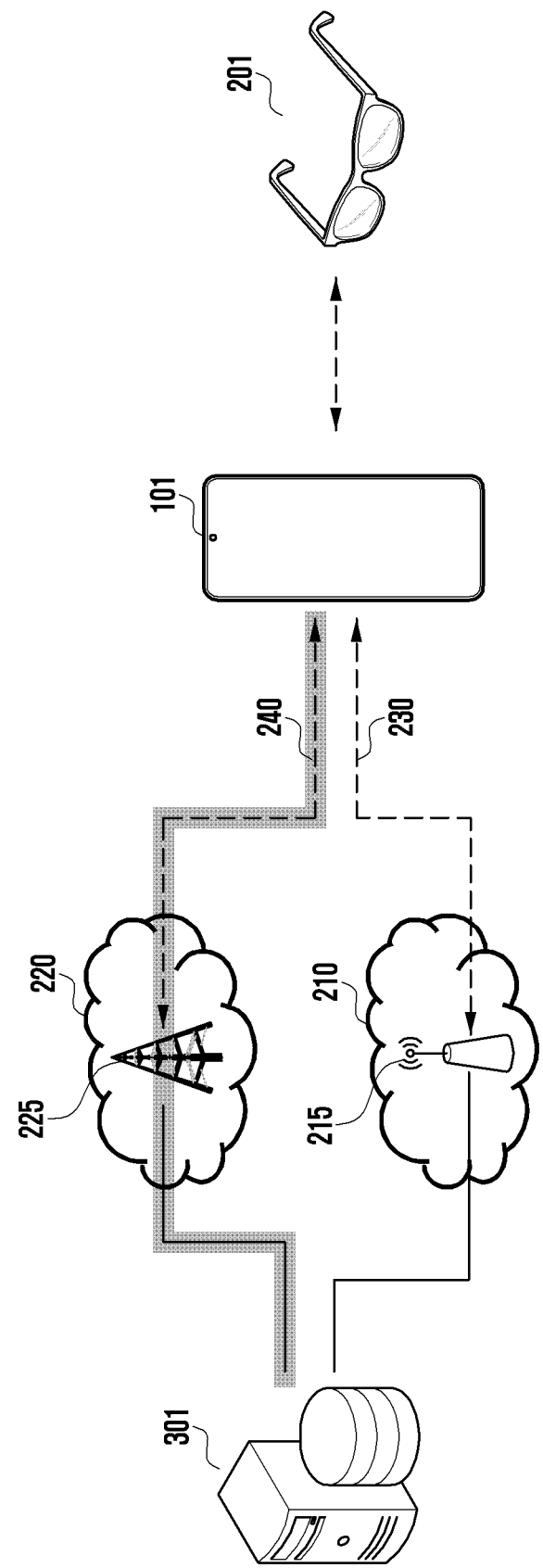

FIGS. 2A, 2B, and 2C illustrate examples of an AR system supporting an AR service according to various embodiments.

According to an embodiment, FIGS. 2A, 2B, and 2C may show examples in which the electronic device 101, an external device 201 (for example, the electronic device 102 of FIG. 1), and a server 301 (for example, the server 108 of FIG. 1) communicate with each other to support an Augmented Reality (AR) service.

As illustrated in FIGS. 2A, 2B, and 2C, an AR system (for example, a tethered AR system) for supporting the AR service according to an embodiment may include the electronic device 101 (for example, a smart phone), the external device 201 (for example, AR glasses, smart glasses, or a display device), the server 301 (for example, cloud), a first network 210 (for example, a Wi-Fi network) including an Access Point (AP) 215 (for example, a Wi-Fi AP or a Wi-Fi router), and a second network 220 (for example, a cellular network) including a base station 225.

According to an embodiment, the electronic device 101 may include, for example, elements corresponding to the description made with reference to FIG. 1. According to an embodiment, the electronic device 101 may perform an operation of a computing host for directly generating relevant data (for example, AR images) (for example, generation based on stored or processed data) for the AR service or acquiring the same from the server 301 and providing the same to the external device 201. For example, the electronic device 101 may be an electronic device such as a smart phone capable of processing images and performing wireless communication with the server 301 through the first network 210 including the AP 215 and/or the second network 220 including the base station 225. According to an embodiment, the electronic device 101 may acquire (for example, receive) at least one piece of scene information (for example, image data), sensor information, and/or location information from the external device 201 through a communication connection with the external device 201.

According to an embodiment, the external device 201 may include an electronic device capable of receiving data (for example, AR images or AR image frames) from the electronic device 101 and providing (for example, displaying) the received data along with real world data through a display of the external device 201. For example, the external device 201 may include a wearable device such as AR glasses and/or smart glasses or a display for supporting a display function. According to an embodiment, the external device 201 may provide (for example, transmit) at least one piece of the scene information, the sensor information, and/or the location information to the electronic device 101 through the communication connection with the electronic device 101.

According to an embodiment, the electronic device 101 and the external device 201 may transmit and receive data through Wireless Local Area Network (WLAN) communication such as Wi-Fi and/or Wi-Gig.

According to an embodiment, the server 301 may include a server (or cloud) (for example, a cloud server, a content server, or a web server) for providing AR content.

According to an embodiment, the first network 210 may include, for example, the AP 215 (for example, a Wi-Fi AP or a Wi-Fi router). According to an embodiment, the first network 210 may provide a first data path 230 (or a first network path) (for example, a Wi-Fi path) between the electronic device 101 and the server 301. For example, as illustrated in FIG. 2B, the first data path 230 may include a path between the electronic device 101, the AP 215, and the server 301, and the electronic device 101 and the server 301 may establish the first data path 230 to communicate with each other via the first network 210 including the AP 215. For example, the first network 210 may provide data from the server 301 to the electronic device 101 through the first data path 230.

According to an embodiment, the second network 220 may include, for example, the base station 225 for a legacy network (for example, a 3G network or a 4G network) and/or a 5G network. According to an embodiment, the second network 220 may provide a second data path 240 (or a second network path) (for example, a cellular path) between the electronic device 101 and the server 301. For example, as illustrated in FIG. 2C, the second data path 240 may include a path between the electronic device 101, the base station 225, and the server 301, and the electronic device 101 and the server 301 may establish the second data path 240 to communicate with each other via the second network 220 including the base station 225. For example, the second network 220 may provide data from the server 301 to the electronic device 101 through the second data path 240.

According to an embodiment, the electronic device 101 may transmit and receive data to and from the server 301 through the first network 210 or the second network 220. According to an embodiment, transmission data which the electronic device 101 transmits to the server 301 may be the scene information, the sensor information, and/or the location information which the electronic device 101 receives from the external device 201 or may include data generated (for example, processed) on the basis of the information. According to an embodiment, reception data which the electronic device 101 receives from the server 301 may include, for example, various pieces of information (or elements) (for example, graphic object information, coordinate information, distance information, and/or text information) included in data (for example, AR images or AR image frames) which the electronic device 101 provides to the external device 201. In another example, reception data which the electronic device 101 receives from the server 301 may include response data of the transmission data transmitted on the basis of the data which the electronic device 101 receives from the external device 201. According to an embodiment, transmission and reception data (for example, transmission data and/or reception data) may vary depending on an AR service or an AR application. For example, the transmission and reception data may vary depending on a condition (for example, resolution or speed) required by the AR service or the AR application.

According to various embodiments, the AR service may be provided on the basis of the system configuration as illustrated in FIGS. 2A, 2B, and 2C.

According to an embodiment, when providing the AR service, the electronic device 101 may determine a data transmission period (or a data transmission time) (for example, a Service Period (SP)) on the basis of an amount of data (or an amount of traffic) for each link according to a data path (or a network path) (for example, the first data path 230 or the second data path 240). According to an embodiment, the operation of determining the SP is described in detail with reference to the following drawing (for example, FIG. 6).

According to an embodiment, the electronic device 101 may determine an image frame transmission period (interval) on the basis of a frame rate (or a refresh rate) or a scan rate (for example, 30 fps, 60 fps, or 12 fps) of the external device 201. For example, the electronic device 101 may determine a first image frame transmission interval (for example, about 33.3 ms) (for example, frame rate=30 fps→interval=33.3 ms) for a first frame rate (for example, about 30 fps). In another example, the electronic device 101 may determine a second image frame transmission interval (for example, about 16.6 ms) (for example, frame rate=60 fps→interval=16.6 ms) for a second frame rate (for example, about 60 fps). In another example, the electronic device 101 may determine a third image frame transmission interval (for example, about 8.3 ms) (for example, frame rate=120 fps→interval=8.3 ms) for a third frame rate (for example, about 120 fps).

According to an embodiment, the electronic device 101 may determine whether a network (for example, the first network 210 or the second network 220) currently connected with the electronic device 101 satisfies a predetermined transmission requirement (or an AR image transmission requirement) on the basis of at least one of the SP and/or the image frame transmission interval. For example, the predetermined transmission requirement may include at least some of a frame rate, a resolution, a transmission rate, and/or an amount of data transmission required by the connected network (for example, the first network 210 or the second network 220) in the AR service or the AR application. According to an embodiment, the electronic device 101 may determine whether to change the network on the basis of the determination result. According to an embodiment, the electronic device 101 may determine whether to change the connection from the first network 210 including the AP 215 to the second network 220 including the base station 225 or from the second network 220 to the first network 210. According to an embodiment, the network (for example, the first network 210 or the second network 220) currently connected between the electronic device 101 and the server 301 may be a communication connection between the electronic device 101 and the server 301 through the AP 215 supporting the first network 210 or through the base station 225 supporting the second network 220. For example, the electronic device 101 may determine whether to make a change from the currently connected network (for example, the first network 210 or the second network 220) to another network, for example, whether to change a network bearer (for example, the first data path 230 or the second data path 240). According to an embodiment, an operation of determining whether to change the network is described in detail with reference to the following drawings.

According to an embodiment, the electronic device 101 may identify whether the type of the network between the electronic device 101 and the server 301 is the same as the type of the network between the electronic device 101 and the external device 201 and determine whether SPs overlap.

According to an embodiment, an operation of determining whether SPs overlap is described in detail with reference to the following drawings.

Figure 3A:
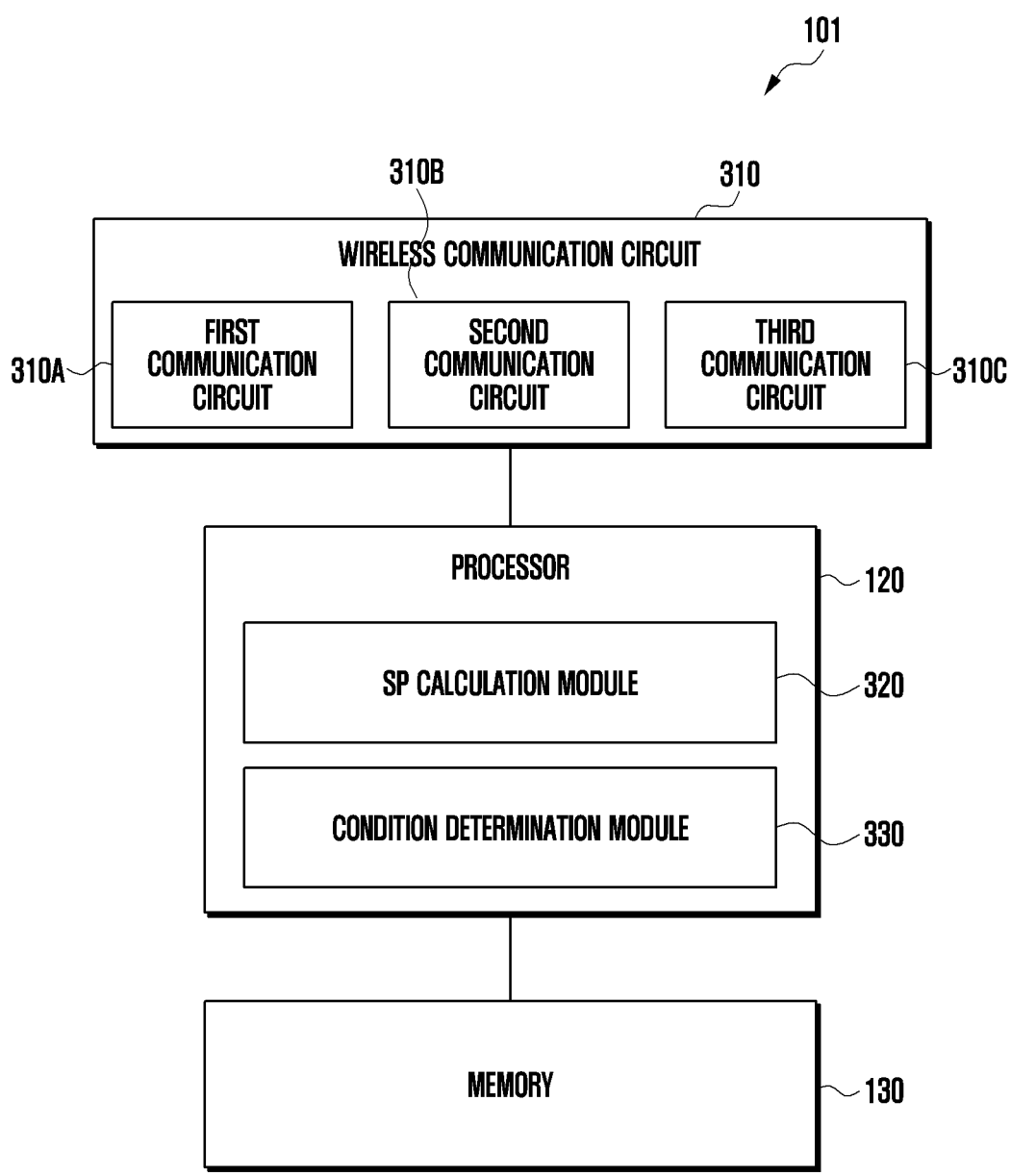
FIG. 3A schematically illustrates the configuration of an electronic device according to various embodiments.

FIG. 3A schematically illustrates the configuration of an electronic device according to various embodiments.

FIG. 3A illustrates an example of the configuration related to supporting the AR service by the electronic device 101 according to various embodiments. According to an embodiment, the electronic device 101 may include various types of devices including a function of establishing a wireless connection with the external device 201 through a predetermined first network (for example, the first network 210 (for example, a Wi-Fi network)), establishing a wireless connection with the server 301 through a predetermined second network (for example, the first network 210 or the second network 220 (for example, a cellular network)), and providing data related to the AR service to the external device 201. For example, the electronic device 101 may include a computing host such as a mobile communication terminal, a smart phone, a table Personal Computer (PC), and/or a notebook.

Referring to FIG. 3A, the electronic device 101 according to an embodiment may include a wireless communication circuit 310, the memory 130, and the processor 120.

According to an embodiment, the wireless communication circuit 310 (for example, the wireless communication module 192 of FIG. 1) may support a legacy network (for example, a 3G network and/or a 4G network), a 5G network, an Out Of Band (OOB), and/or a next-generation communication technology (for example, a New Radio (NR) technology). The wireless communication circuit 310 may correspond to the wireless communication module 192 as illustrated in FIG. 1. The wireless communication circuit 310 according to an embodiment may include a first communication circuit 310A configured to support wireless communication of the electronic device 101 through the first network 210 (for example, a Wi-Fi network), a second communication circuit 310B configured to support wireless communication of the electronic device 101 through the second network 220 (for example, a cellular network), and a third communication circuit 310C configured to support wireless communication of the electronic device 101 on the basis of the OOB (for example, NFC, BLE, and/or Wi-Fi 2.4 GHz). According to an embodiment, the electronic device 101 may communicate with the external device 201 and/or the server 301 using the first communication circuit 310A through the first network 210. According to an embodiment, the electronic device 101 may communicate with the server 301 using the second communication circuit 310B through the second network 210. According to an embodiment, the electronic device 101 may communicate with the external device 201 using the third communication circuit 310C through a network (for example, a short-range communication network such as Bluetooth, wireless fidelity (WiFi) direct, or Infrared Data Association (IrDA)) different from the first network 210.

According to an embodiment, the memory 130 may correspond to the memory 130 as described with reference to FIG. 1. According to an embodiment, when providing the AR service, the memory 130 may store various pieces of data used by the electronic device 101. Data may include, for example, software (for example, the program 140) and input data or output data on a command related thereto. According to an embodiment, when executed, the memory 130 may store instructions causing the processor 120 to operate.

According to an embodiment, the processor 120 may correspond to the processor 120 described with reference to FIG. 1. According to an embodiment, the processor 120 may control the external device 201 connected to the electronic device 101 by executing, for example, an application (for example, an AR application) and perform various data processing or calculations related to the AR service. According to an embodiment, as at least a portion of the data processing or the calculation, the processor 120 may store data received through the wireless communication circuit 310 in the memory 130, process the data stored in the memory 130, and store resultant data in the memory 130 and/or transmit the same to the external device 201 through the wireless communication circuit 310.

According to an embodiment, the processor 120 may transmit and receive required data to and from the server 301 through the wireless communication circuit 310 in the tethered AR system, receive at least one piece of information (for example, scene information, sensor information, location information, and/or a frame rate) related to elements (for example, a camera, a sensor, and/or a display) mounted to the external device 201 from the external device 201, and transmit processed data (for example, AR images) to the external device 201 on the basis of the received information. According to an embodiment, when transmitting and receiving data to and from the external device 201 in the AR system, the processor 120 may control (or select) a network for low latency and/or low power communication.

According to an embodiment, the processor 120 may control transmission and reception of data to and from the server 301 through the first communication circuit 310A supporting the first network 210 or the second communication circuit 310B supporting the second network 220. According to an embodiment, the processor 120 may configure transmission data on the basis of the scene information, the sensor information, the location information, and/or the frame rate information received from the external device 201. According to an embodiment, transmission data may include, for example, elements for configuring AR images (or AR image frames).

According to an embodiment, the processor 120 may include an SP calculation module 320 and a condition determination module 330 configured to perform an operation related to the control of the network for low latency and/or low power communication in data communication for the AR service with each of the server 301 and the external device 201. According to an embodiment, elements (for example, the SP calculation module 320 and the condition determination module 330) included in the processor 120 may be understood as, for example, hardware modules (for example, circuitry) but various embodiments are not limited thereto. For example, the elements (for example, the SP calculation module 320 and the condition determination module 330) included in the processor 120 may additionally or alternatively include a software structure as well as the hardware structure. According to an embodiment, the elements (for example, the SP calculation module 320 and the condition determination module 330) included in the processor 120 may be implemented as software (for example, the program 140 of FIG. 1) including one or more instructions stored in a storage medium (for example, the memory 130) which can be read by the processor 120. According to an embodiment, operations performed by the SP calculation module 320 and the condition determination module 330 may be stored in the memory 130 and performed by instructions executed by the processor 120 when executed.

According to an embodiment, the SP calculation module 320 may perform an operation of determining an SP on the basis of, for example, an amount of data and determining an image frame transmission interval on the basis of the frame rate of the external device 201. According to an embodiment, the processor 120 may calculate an amount of required transmission (for example, an amount of data per frame) according to each link in communication between the external device 201 and the server 301 through the first network 210 and determine the SP and the image frame transmission interval according thereto. According to various embodiments, the processor 120 may include the main processor 121 of FIG. 1 (for example, a Central Processing Unit (CPU) or an Application Processor (AP)) or the auxiliary processor 123 (for example, a Communication Processor (CP)). According to an embodiment, some of the SP calculation module 320 and/or the condition determination module 330 may be included in the wireless communication circuit 310.

According to an embodiment, the condition determination module 330 may perform an operation of determining whether the current network (or data path) connected to the electronic device 101 satisfies a predetermined transmission requirement (or an AR image transmission requirement) on the basis of the determined SP and the determined image frame transmission interval. According to an embodiment, the predetermined transmission requirement may include at least some of a frame rate, a resolution, a transmission rate, and/or a data transmission amount required by the connected network (for example, the first network 210 or the second network 220) in the AR service or the AR application.

According to an embodiment, the processor 120 may determine whether to change the current network on the basis of whether the transmission requirement is satisfied. For example, when communication based on the current network does not satisfy the transmission requirement, the processor 120 may determine the change in the network. In another example, when the communication based on the current network satisfies the transmission requirement, the processor 120 may determine not to change the network.

According to an embodiment, when the network is the first network 210 (for example, the Wi-Fi network) including the AP 215, the processor 120 may identify at least one piece of information such as a channel (for example, a Wi-Fi channel) of the first network 210, a bandwidth, and/or a link speed. According to an embodiment, when the first network 210 (for example, a communication state based on the AP 215) satisfies the image transmission requirement on the basis of at least one piece of information, the processor 120 may control the wireless communication circuit 310 (for example, the first communication circuit 310A) to make a communication (for example, Wi-Fi) connection with the external device 201 through a channel which is the same as the channel connected to the first network 210 (for example, the AP 215). For example, the processor 120 may identify the channel (for example, the Wi-Fi channel), the bandwidth, and/or the link speed of the external device 201 through the third communication circuit 310 supporting Out Of Band (OOB) (for example, NFC, BLE, and/or Wi-Fi 2.4 GHz) communication and determine whether to support communication between the electronic device 101 and the external device 201 and communication between the electronic device 101 and the AP 215 through the first network 210.

According to another embodiment, when the first network 210 (for example, a communication state based on the AP 215) does not satisfy the image transmission requirement on the basis of at least one piece of information, the processor 120 may control the wireless communication circuit 310 (for example, the first communication circuit 310A) to search for another AP capable of establishing another connection (or roaming) for communication through the first network 210.

According to an embodiment, when performing an operation of searching for another AP, the processor 120 may first search for another AP in, for example, a bandwidth of 160 MHz in a band of about 6 GHz and, when the found AP satisfies the image transmission requirement, make the connection with the found AP.

According to some embodiments, when there is no AP which satisfies the image transmission requirement, the processor 120 may perform an operation of switching to the second network 220 (for example, a cellular network) (or changing a data path).

According to an embodiment, the processor 120 may allow the network between the server 301 and the electronic device 101 to be the same as or different from the network between the electronic device 101 and the external device 201 on the basis of the control of the network.

According to an embodiment, when the electronic device 101 is connected to the server 301 through the second network 220 including the base station 225, for the connection between the electronic device 101 and the external device 201, the processor 120 may select one (e.g., channel 3) of channels in a band of about 6 GHz by calculating channel congestion by preferentially using channels (for example, a plurality of channels in a band of 160 MHz) in the band of about 6 GHz among a plurality of channels (e.g., channel 1~5) supporting the first network 210. According to an embodiment, the processor 120 may connect the electronic device 101 and the external device 201 on the basis of the channel selected from among the plurality of channels supporting the first network 210, negotiate an SP and an image frame transmission interval (hereinafter, referred to as an "interval") between the electronic device 101 and the external device 201, and determine the SP and the interval of communication with the server 301 through the second network 220 on the basis of the negotiation result.

According to some embodiments, the processor 120 may search for an AP of the first network 210 which satisfies the transmission requirement of the external device 201 while using communication with the server 301 through the second network 220. According to an embodiment, when the AP which satisfies the transmission requirement of the external device 201 is found, the processor 120 may make the connection (or roaming) with the corresponding AP.

According to an embodiment, the processor 120 may determine whether SPs overlap on the basis of whether the network type of a first period between the electronic device 101 and the server 301 is the same as the network type of a second period between the electronic device 101 and the external device 201, and control the network on the basis of the determination result. According to an embodiment, an operation of determining whether SPs overlap is described in detail with reference to the following drawings.

Figure 3B:
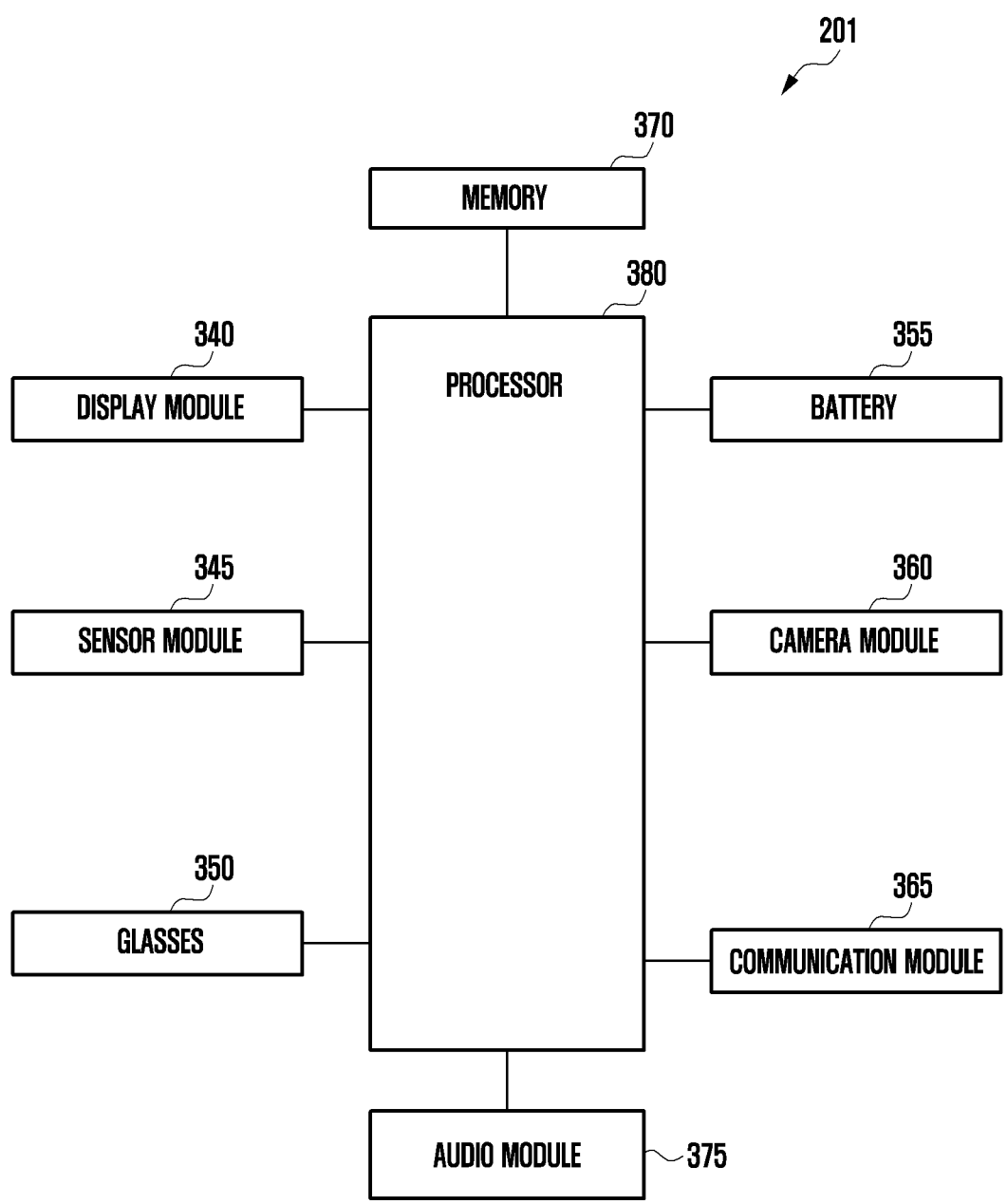
FIG. 3B schematically illustrates the configuration of an external device according to various embodiments.

FIG. 3B schematically illustrates the configuration of an external device according to various embodiments.

According to an embodiment, FIG. 3B illustrates an example of the configuration related to supporting of the AR service by the external device 201 according to various embodiments. According to an embodiment, the external device 201 illustrated in FIG. 3B may include all or at least some of the elements of the electronic device 101 described with reference to FIG. 1. According to an embodiment, FIG. 3B illustrates an example in which the external device 201 is an AR device (for example, AR glasses, smart glasses, or a display device).

Referring to FIG. 3B, the external device 201 may include a processor 380 (for example, the processor 120 of FIG. 1), a display module 340 (for example, the display module 160 of FIG. 1), a sensor module 345 (for example, the sensor module 176 of FIG. 1), glasses 350, a battery 355 (for example, the battery 189 of FIG. 1), a camera module 360 (for example, the camera module 180 of FIG. 1), a communication module 365 (for example, the communication module 190 of FIG. 1), a memory 370 (for example, the memory 130 of FIG. 1), and an audio module 375 (for example, the audio module 170 of FIG. 1).

According to an embodiment, the elements included in the external device 201 may be understood as, for example, hardware modules (for example, circuitry). According to an embodiment, the elements included in the external device 201 are not limited to the elements illustrated in FIG. 3B (for example, the display module 340, the sensor module 345, the glasses 350, the battery 355, the camera module 360, the communication module 365, the memory 370, and/or the audio module 375). For example, the elements illustrated in FIG. 3B may be omitted or replaced with other elements, or additional elements may be added to the external device 201. For example, the glasses 350 may be included when the external device 201 is AR glasses and/or smart glasses, and may not be included when the external device 201 is a smart phone.

According to an embodiment, the communication module 365 may include an antenna module (for example, the antenna module 197 of FIG. 1) and may support various technologies (for example, beamforming, multiple input and output (MIMO), and/or an array antenna) for securing the performance in a predetermined frequency band. According to an embodiment, the communication module 365 may transmit signals or power to the outside (for example, the electronic device 101) or receive the same from the outside. According to an embodiment, the communication module 365 may include a communication circuit configured to support wireless communication of the external device 201 through the first network 210 and/or a communication circuit configured to support wireless communication of the external device 201 on the basis of the OOB.

According to an embodiment, the memory 370 may correspond to the memory 130 as described with reference to FIG. 1. According to an embodiment, when the external device 201 provides the AR service, the memory 370 may store various pieces of data used by the external device 201. Data may include, for example, software (for example, the program 140) and input data or output data on a command related thereto.

According to an embodiment, the processor 380 may correspond to the processor 120 described with reference to FIG. 1. According to an embodiment, the processor 380 may execute, for example, an application (for example, an AR application) and provide (for example, transmit) at least one piece of information such as scene information, sensor information, and/or location information to the electronic device 101 through the communication connection with the electronic device 101. According to an embodiment, the processor 380 may control the display module 340 to display one image (for example, an AR screen) by overlaying various pieces of digital content (for example, AR images) on the real world provided through the display module 340. According to an embodiment, the external device 201 may include various sensors (for example, the sensor module 345 or the camera module 360), and the processor 380 may acquire at least one piece of information such as scene information (for example, image data), sensor information, and/or location information on the basis of sensing information using at least one sensor.

According to an embodiment, the processor 120 may perform various data processing or calculations related to the AR service. For example, as at least a portion of the data processing or calculations, the processor 380 may store data received through the communication module 365 in the memory 370, process the data stored in the memory 370, and store resultant data in the memory 370 and/or transmit the same to the electronic device 101 through the communication module 365.

According to an embodiment, when executing the AR service, the processor 380 may control the communication module 365 to transmit frame rate information of the external device 201 to the electronic device 101. According to an embodiment, the processor 120 may negotiate a Target Wake Time (TWT) while establishing the connection with the electronic device 101. According to an embodiment, the processor 380 may transmit and receive data to and from the electronic device 101 on the basis of the TWT setup and display the transmitted and received data through the display module 340.

The electronic device 101 according to various embodiments of the disclosure may include the wireless communication circuit 310 (for example, the wireless communication module 192 of FIG. 1) and the processor 120 operatively connected to the wireless communication circuit 310, wherein the processor 120 may be configured to identify a first Service Period (SP) on the basis of a data amount of a predetermined data path when an Augmented Reality (AR) service with an external device 201 is initiated, identify a transmission interval on the basis of a frame rate of the external device 201, identify whether a network connected to the electronic device 101 satisfies a predetermined transmission requirement on the basis of at least the first SP and the transmission interval, determine connection information related to a connection with the external device 201 on the basis of a network which satisfies the transmission requirement, and make the connection with the external device 201 on the basis of the connection information.

According to various embodiments of the disclosure, the processor 120 may be configured to configure a first TWT related to a first link on the basis of a Target Wake Time (TWT) element of the first link between the electronic device 101 and the external device 201 and configure a second TWT related to a second link between the electronic device and the network on the basis of at least the first TWT and a TWT element of the first link, and the TWT element includes a TWT wake interval, a TWT wake duration, and a TWT.

According to various embodiments of the disclosure, the processor 120 may be configured to calculate the first SP on the basis of a data amount of the first link, calculate a second SP on the basis of a data amount of the second link, and determine that the network satisfies the transmission requirement when a sum of the first SP and the second SP is included in a transmission interval according to the frame rate.

According to various embodiments of the disclosure, the first SP includes a required time calculated by dividing a data amount required for transmission of one frame in the first link between the electronic device 101 and the external device 201 by a link bandwidth of the first link.

According to various embodiments of the disclosure, the second SP may include a required time calculated by dividing a data amount required for transmission of one frame in the second link between the electronic device 101 and the network by a link bandwidth of the second link.

According to various embodiments of the disclosure, the processor 120 may be configured to determine whether to change the network on the basis of whether the network satisfies the transmission requirement.

According to various embodiments of the disclosure, the processor 120 may be configured to search for another AP supporting the first network 210 when the network is the Access Point (AP) 215 supported by the first network 210 and the AP 215 does not satisfy the transmission requirement, and an AP in a predetermined band may be preferentially searched for when another AP is searched for.

According to various embodiments of the disclosure, the processor 120 may be configured to change the network from the first network 210 to the second network 220 when the search for another AP satisfying the transmission requirement fails.

According to various embodiments of the disclosure, the processor 120 may be configured to determine a network satisfying the transmission requirement, determine connection information related to a connection with the external device 201 on the basis of the determined network, and transmit the determined connection information to the external device 201 through Out Of Band (OOB) communication.

According to various embodiments of the disclosure, the processor 120 may be configured to determine that a channel through which the electronic device 101 is connected with the network is a channel between the electronic device 101 and the external device 201.

According to various embodiments of the disclosure, the processor 120 may be configured to determine that a first channel equal to a channel configured with the network is the connection information when the determined network is the first network 210 and determine that a second channel different form the first channel is the connection information when the determined network is the second network 220.

According to various embodiments of the disclosure, the processor 120 may be configured to determine the connection information on the basis of a channel busy degree of the first network 210 when the network is the first network 210.

According to various embodiments of the disclosure, the processor 120 may be configured to preferentially measure the channel busy degree on the basis of a channel in a predetermined band in the first network 210 and determine that a channel having a low channel busy degree is a channel for a connection with the external device 201 on the basis of the measurement result.

According to various embodiments of the disclosure, the processor 120 may be configured to determine whether SPs overlap each other on the basis of whether a network type of a first link between the electronic device 101 and the external device 201 is equal to a network type of a second link between the electronic device 101 and the network.

According to various embodiments of the disclosure, the processor 120 may be configured to control the first SP and the second SP not to overlap each other when the network types of the first link and the second link are equal to each other, and control the first SP and the second SP to at least partially overlap each other when the network types of the first link and the second link are different from each other.

The electronic device 101 according to various embodiments of the disclosure may include the wireless communication circuit 310 (for example, the wireless communication module 192 of FIG. 1) and the processor 120, wherein the processor 120 may be configured to detect a connection with the external device 201 through the wireless communication circuit 310, acquire a data amount of a first link between the electronic device 101 and the external device 201 and a data amount of a second link between the electronic device 101 and the network, calculate a first Service Period (SP) of the first link on the basis of the data amount of the first link, calculate a second SP of the second link on the basis of the data amount of the second link, determine a network satisfying an image transmission requirement on the basis of the first SP and the second SP, and make the connection with the external device 201 by configuring a channel of the first link to be equal to a channel of the second link on the basis of the determined network.

Hereinafter, a method of operating the electronic device 101 according to various embodiments is described. According to various embodiments, operations performed by the electronic device 101 described below may be performed by the processor 120 including at least one processing circuit of the electronic device 101. According to an embodiment, the operations performed by the electronic device 101 may be stored in the memory 130 and may be performed by instructions executed by the processor 120 when executed.

Figure 4:
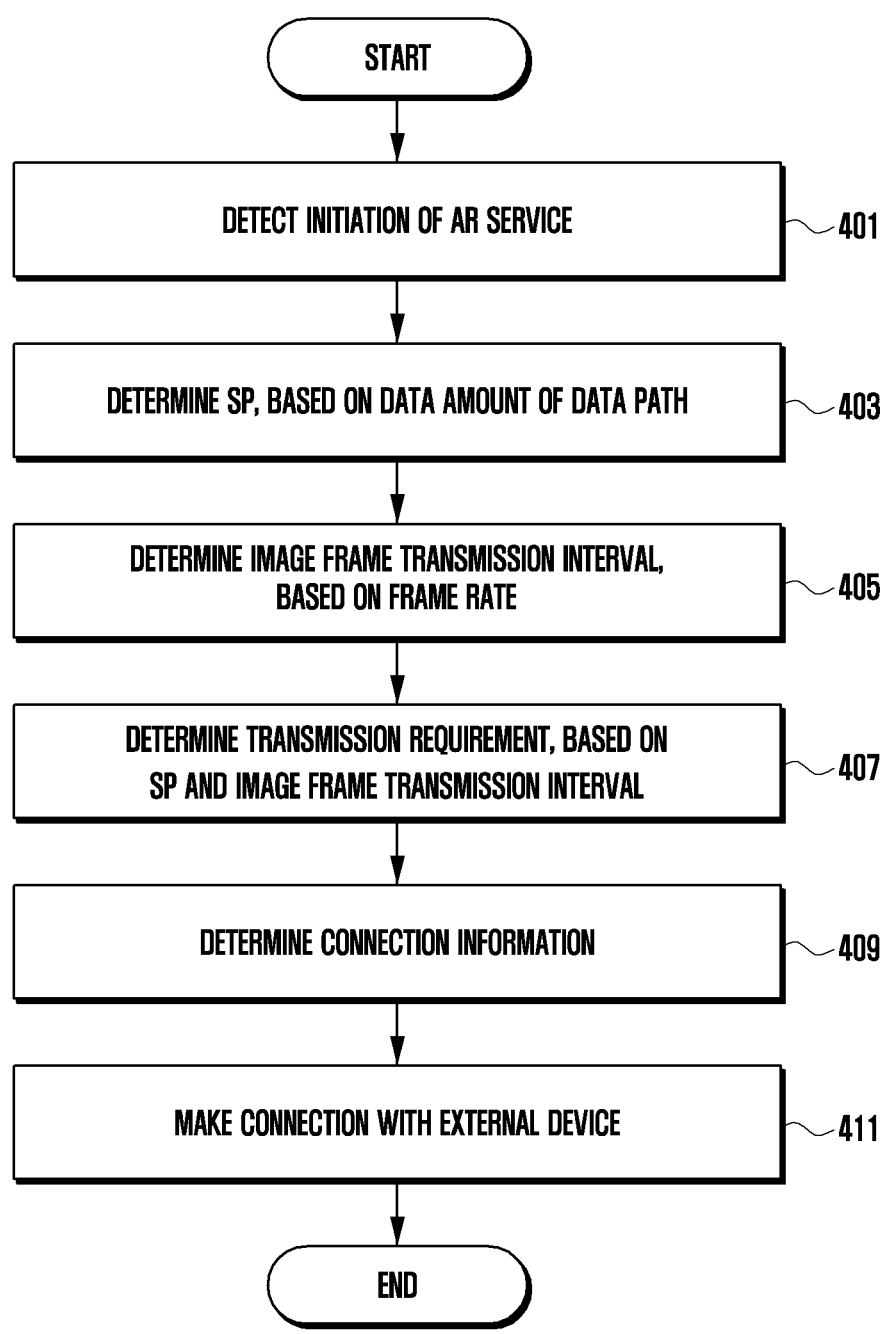
FIG. 4 is a flowchart illustrating an operation of the electronic device according to various embodiments.

FIG. 4 is a flowchart illustrating an operation of an electronic device according to various embodiments.

Referring to FIG. 4, in operation 401, the processor 120 of the electronic device 101 may detect initiation of the AR service. According to an embodiment, the processor 120 may detect initiation of the AR service on the basis of execution of an application (for example, an AR application) related to the AR service in the electronic device 101 and/or detection of a request for the connection with the external device 201.

In operation 403, the processor 120 may determine (or calculate) an SP on the basis of an amount of data of a predetermined data path (for example, the first data path 230 or the second data path 240) in response to the detection of the initiation of the AR service. According to an embodiment, the processor 120 may determine the SP on the basis of an amount of data (or an amount of traffic) for each link. For example, the processor 120 may determine the SP on the basis of an amount of data related to a first link between the electronic device 101 and the external device 201, an amount of data related to a second link between the electronic device 101 and a network (for example, the first network 210 or the second network 220), and/or a bandwidth for each link. An operation of determining the SP according to an embodiment is described in detail with reference to the following drawings.

In operation 405, the processor 120 may identify an image frame transmission interval on the basis of a frame rate (or a refresh rate or a scan rate) of the external device 201. According to an embodiment, when the external device 201 provides a first frame rate (for example, about 30 fps), the processor 120 may determine a first image frame transmission interval (for example, about 33.3 ms) according to the first frame rate (for example, frame rate=30 fps→interval=33.3 ms). According to another embodiment, when the external device 201 provides a second frame rate (for example, about 60 fps), the processor 120 may determine a second image frame transmission interval (for example, about 16.6 ms) according to the second frame rate (for example, frame rate=60 fps→interval=16.6 ms). According to another embodiment, when the external device 201 provides a third frame rate (for example, about 120 fps), the processor 120 may determine a third image frame transmission interval (for example, about 8.3 ms) according to the third frame rate (for example, frame rate=120 fps→interval=8.3 ms). According to an embodiment, operation 403 and operation 405 are not limited to the illustrated order, and may be performed sequentially, in parallel, or inversely sequentially. According to an embodiment, the processor 120 may receive information on the frame rate of the external device 201 through Out Of Band (OOB) communication or identify information on the frame rate of the external device 201 related to the AR service on the basis of a connection history.

In operation 407, the processor 120 may determine a transmission requirement (for example, an AR image transmission requirement) on the basis of at least one of the SP and/or the image frame transmission interval. According to an embodiment, the processor 120 may determine whether the network (for example, the first network 210 or the second network 220) currently connected to both the electronic device 101 and the server 301 satisfies the AR image transmission requirement on the basis of at least one of the SP and/or the image frame transmission interval. For example, the network currently connected between the electronic device 101 and the server 301 may be a communication connection between the electronic device 101 and the server 301 through the AP 215 supporting the first network 210 or a communication connection between the electronic device 101 and the server 301 through the base station 225 supporting the second network 220.

In operation 409, the processor 120 may determine connection information (for example, channel information) related to the connection with the external device 201 (or for the AR service with the external device 201). According to an embodiment, the processor 120 may determine whether to change the network between the electronic device 101 and the server 301 on the basis of the result of determining the transmission requirement. According to an embodiment, an operation of determining whether to change the network is described in detail with reference to the following drawings. According to an embodiment, the processor 120 may determine relevant connection information on the basis of the determined network (for example, the first network 210 or the second network 220). For example, the processor 120 may determine a channel between the external device 201 and the electronic device 101 on the basis of the channel connected between the determined network and the electronic device 101. According to an embodiment, the processor 120 may transfer connection information related to the determined channel (for example, channel information) to the external device 201 through the OOB (for example, BLE).

In operation 411, the processor 120 may establish a connection with the external device 201. According to an embodiment, the processor 120 may differently configure a communication connection with the external device 201 on the basis of the determined network (for example, the first network 210 or the second network 220). For example, the processor 120 may perform low latency or low power communication by controlling SPs to overlap when a first period between the electronic device 101 and the server 301 and a second period between the electronic device 101 and the external device 201 communicate using different bands or different types of networks (for example, communicate in the second data path 240 through the second network 220) and controlling SPs to avoid overlap when the first section and the second section communicate using the same band or the same of network (for example, communicate in the second data path 240 through the first network 210). An operation of establishing the connection between the electronic device 101 and the external device 201 according to an embodiment is described in detail with reference to the following drawings.

Figure 5:
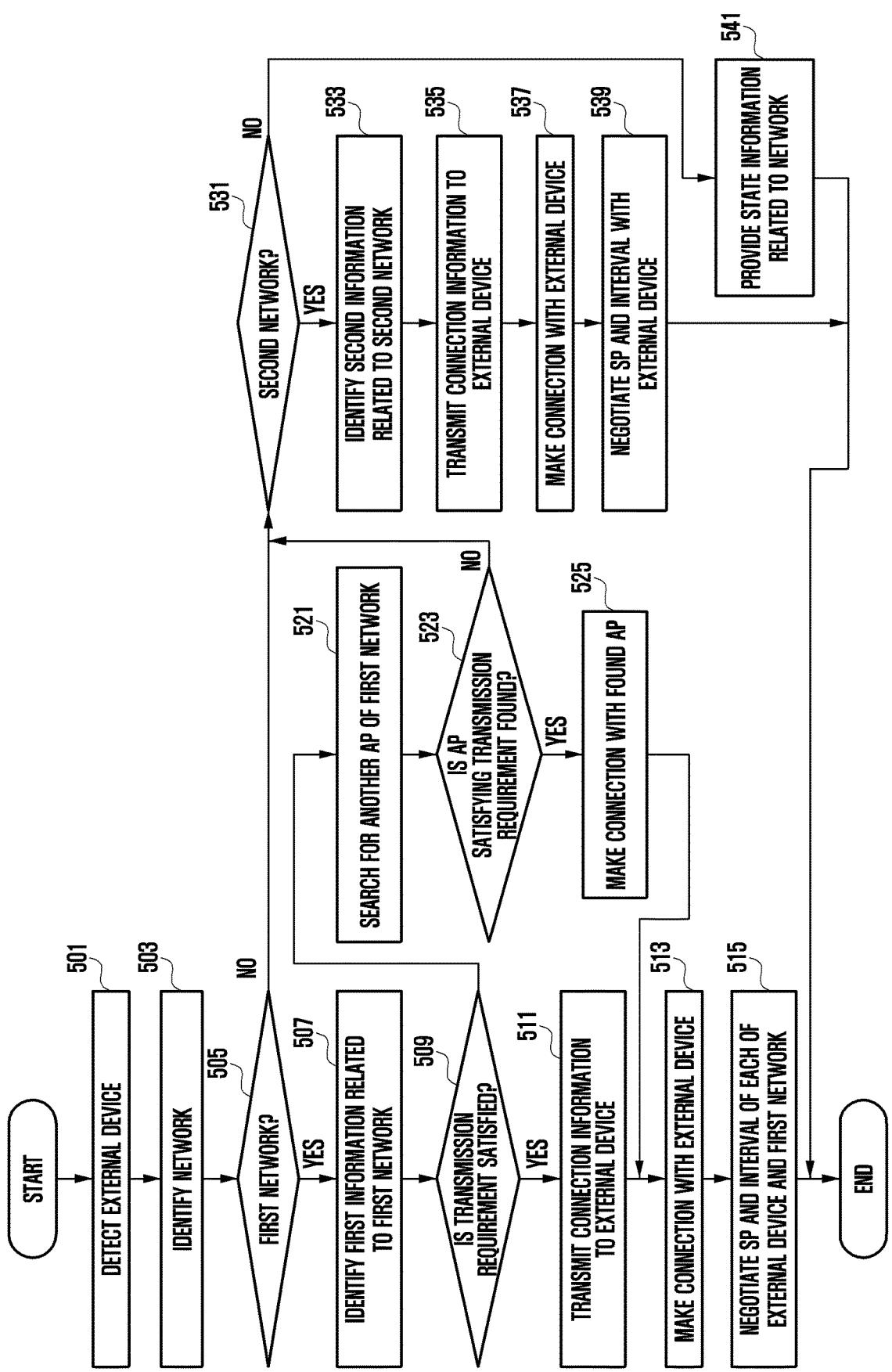
FIG. 5 is a flowchart illustrating an operation of establishing the connection with the external device by the electronic device according to various embodiments.

FIG. 5 is a flowchart illustrating an operation of establishing the connection with an external device by an electronic device according to various embodiments.

According to an embodiment, FIG. 5 illustrates an example of an operation in which the electronic device 101 performs network selection and network control. For example, FIG. 5 illustrates an example of an operation in which the electronic device 101 determines whether to change a network and makes a connection between the electronic device 101 and the external device 201 on the basis of determination indicating whether the network is changed.

Referring to FIG. 5, in operation 501, the processor 120 of the electronic device 101 may detect the external device 201. According to an embodiment, the processor 120 may detect the external device 201 which can be connected through Out Of Band (OOB) communication. According to an embodiment, the OOB may use various communication schemes such as NFC, BLE, and/or Wi-Fi 2.4 GHz communication. According to an embodiment, the processor 120 may detect the external device 201 through BLE as the OOB and make the connection with the external device 201 through a specific channel using a Wi-Fi direct protocol. For example, the external device 201 may periodically broadcast a BLE advertisement message. The external device 201 may include information indicating that the external device 201 is a device for the AR service through the BLE advertisement message. The electronic device 101 may perform periodic BLE scan and, when receiving the BLE advertisement message of the external device 201, perform an operation of determining a channel (for example, a WLAN channel) to make the connection with the external device 201. According to an embodiment, when determining a channel to establish a wireless (for example, WLAN) connection between the electronic device 101 and the external device 201, the processor 120 may determine the channel to make the wireless (for example, WLAN) connection between the electronic device 101 and the external device 201 through different methods in the cases in which the network is the first network 210 (for example, a Wi-Fi network) and the network is the second network 220 (for example, a cellular network). A method of determining a channel according to an embodiment is described below.

In operation 503, the processor 120 may identify the network (e.g., for example, the first network 210 or the second network 220) to be connected with the electronic device 101 based on detection of the external device 201 to which connection can be made through the OOB. According to an embodiment, the network may indicate a path supporting data transmission and reception between the electronic device 101 and the server 301. For example, the identification of the network may mean whether communication with the server 301 is performed through a Wi-Fi AP (for example, the AP 215 of FIG. 2) supporting the first network 210 and whether communication with the server 301 is performed through a base station (for example, the base station 225 of FIG. 2) supporting the second network 220.

In operation 505, the processor 120 may identify whether the network currently connected to the electronic device 101 corresponds to the first network 210 based on the result of the identification of the network.

When it is identified that the network is the first network 210 including the AP (for example, the AP 215 of FIG. 2) (for example, "Yes" of operation 505), the processor 120 may identify first information related to the first network 210 connected to the electronic device 101 in operation 507. For example, when the network is the first network 210, the processor 120 may identify information such as a Wi-Fi channel, a bandwidth, and/or a link speed of the AP of the first network 210.

In operation 509, the processor 120 may identify whether the first network 210 (and/or a communication state based on the AP) satisfies the image transmission requirement of the external device 201 based on the identified first information. According to an embodiment, the processor 120 may identify whether the image transmission requirement is satisfied in the entire AR system. According to an embodiment, the processor 120 may determine whether the image transmission requirement is satisfied on the basis of the time occupied by a first SP and a second SP and an interval according to a frame rate. According to an embodiment, the first SP may indicate a required time calculated by dividing a data amount (for example, uplink (UL)/downlink (DL) data amount) required for transmission of one frame by the electronic device 101 and the external device 201 by a link bandwidth (for example, a link bandwidth of the first network 210). According to an embodiment, the second SP may indicate a required time calculated by dividing a data amount (for example, UL/DL data amount) required for transmission of one frame by the electronic device 101 and the server 301 by a link bandwidth (for example, a link bandwidth of the second network 220). An operation of identifying whether the image transmission requirement is satisfied according to an embodiment is described below.

When the first network 210 satisfies the image transmission requirement (for example, "Yes" of operation 509), the processor 120 may transmit connection information (for example, channel information) to the external device 201 in operation 511. According to an embodiment, when a sum of the calculated first SP and second SP is included in a predetermined interval (for example, when the sum of the first SP and the second SP is smaller than an interval according to a frame rate of the external device 201), the processor 120 may determine that the corresponding network (for example, the AP of the first network 210) satisfies the image transmission requirement. According to an embodiment, when the image transmission requirement is satisfied, the processor 120 may determine that the channel connected between the AP of the first network and the electronic device 101 is a channel between the external device 201 and the electronic device 101. According to an embodiment, the processor 120 may transfer channel information related to the determined channel to the external device 201 on the basis of an OOB (for example, BLE).

In operation 513, the processor 120 may establish a wireless connection (for example, WLAN connection) with the external device 201 based on the determined channel.

In operation 515, the processor 120 may negotiate a link (for example, a first link between the electronic device 101 and the external device 201 or a second link between the electronic device 101 and the AP) with each of the external device 201 and the AP supporting the first network 210. According to an embodiment, the processor 120 may execute negotiate by configuring SP duration, an SP start time, and/or an SP interval for each link (for example, a first link between the electronic device 101 and the external device 201 or a second link between the electronic device 101 and the AP), based on the first network 210. An operation for negotiating the SP and the interval for each link according to an embodiment is described below.

When the network is the first network 210 and the first network 210 does not satisfy the image transmission requirement of the external device 201 (for example, "No" of operation 509), the processor 120 may search for another AP of the first network 210 in operation 521. According to an embodiment, when it is determined that the connection of the first network 210 between the current electronic device 101 and the AP does not satisfy the image transmission requirement between the electronic device 101 and the external device 201, the processor 120 may perform an operation of searching for another AP supporting the first network 210 which can be connected (or roamed). According to an embodiment, when performing the operation of searching for another AP which can be connected, the processor 120 may preferentially search for another AP supporting a bandwidth of about 160 MHz in a band of about 6 GHz of the WLAN. In the AR system, latency performance may be important, and, for example, a band of about 6 GHz may be further free of interference by a wide bandwidth (for example, about 160 MHz). Accordingly, the processor 120 may operate to first search for the WLAN in the band of about 6 GHz.

In operation 523, the processor 120 may identify whether another AP satisfies the image transmission requirement is found on the basis of the result of the search for another AP.

When another AP satisfies the image transmission requirement is found (for example, "Yes" of operation 523), the processor 120 may proceed to operation 525 and perform operations after operation 525. When another AP which satisfies the image transmission requirement is not found (for example, "No" of operation 523), for example, when the search for an AP which satisfies the image transmission requirement fails, the processor 120 may proceed to operation 531 and perform operations after operation 531.

In operation 525, the processor 120 may perform an operation for establishing connection with another found AP. According to an embodiment, when another AP which satisfies the image transmission requirement is found, the processor 120 may make the connection with another AP, proceed to operation 513, and perform an operation of establishing the connection with the external device 201 through a channel which is the same as the channel connected with another AP and scheduling the interval or the SP.

When the network is not the first network 210 in operation 505 (for example, "No" of operation 505) or when another AP which satisfies the image transmission requirement is not found in operation 523 (for example, "No" of operation 523), the processor 120 may proceed to operation 531.

In operation 531, the processor 120 may identify whether the network currently connected to the electronic device 101 corresponds to the second network 220 including a base station (for example, the base station 225 of FIG. 2). For example, when there is no connection with the first network 210 or when no AP which satisfies the image transmission requirement is found, the processor 120 may identify whether the network corresponds to the second network 220.

When the network currently connected to the electronic device 101 is not identified (for example, "No" of operation 531), the processor 120 may provide state information related to the network to the external device 201 in operation 541. According to an embodiment, the external device 201 may display a current state in the display module 340 on the basis of reception of the state information from the electronic device 101. According to an embodiment, when there is no connection of the first network 210 and the second network 220, the processor 120 may transfer information indicating that there is no network connection of the electronic device 101 to the external device 201 through the OOB and notify the user of information indicating that there is no network connection on the basis of each user interface of the electronic device 101 and/or the external device 201 (for example, displaying on a display or providing an alarm sound).

When it is identified that the network connected to the electronic device 101 is the second network 220 including a base station (for example, the base station 225 of FIG. 2) on the basis of the result of the identification of the network(for example, "Yes" of operation 531), the processor 120 may identify second information related to the second network 220 connected to the electronic device 101 in operation 533. For example, when the network is the second network 220, the processor 120 may perform an operation of identifying second information on a WLAN channel for establishing the connection between the electronic device 101 and the external device 201. For example the second information may include a channel busy degree of at least one of a plurality of channels of the first network 210. For example, the processor 120 may measure channel busy degrees of a plurality of channels in a bandwidth of about 160 MHz of a band of about 6 GHz among a plurality of channels supporting the first network 210. According to an embodiment, the processor 120 may perform an operation of measuring the channel busy degree. For example, the channel busy degree may be calculated as a ratio of a time for which a wireless channel is occupied by wireless packets by other electronic devices to a predetermined time.

In operation 535, the processor 120 may transmit connection information (for example, channel information) to the external device 201. According to an embodiment, the processor 120 may select a channel having the lowest "busy degree" on the basis of the measured channel busy degrees and determine that the selected channel has connection information (for example, channel information) related to the first network 210 between the external device 201 and the electronic device 101. According to an embodiment, the processor 120 may transfer channel information related to the determined channel to the external device 201 on the basis of an OOB (for example, BLE).

In operation 537, the processor 120 may establish a wireless connection (for example, WLAN connection) with the external device 201 on the basis of the determined channel.

In operation 539, the processor 120 may negotiate a link (for example, the first link between the electronic device 101 and the external device 201) with the external device 201. According to an embodiment, the processor 120 may execute negotiate by configuring SP duration, an SP start time, and/or an SP interval of each link (for example, the first link between the electronic device 101 and the external device 201 and the second link between the electronic device 101 and the second network 220).

Figure 6:
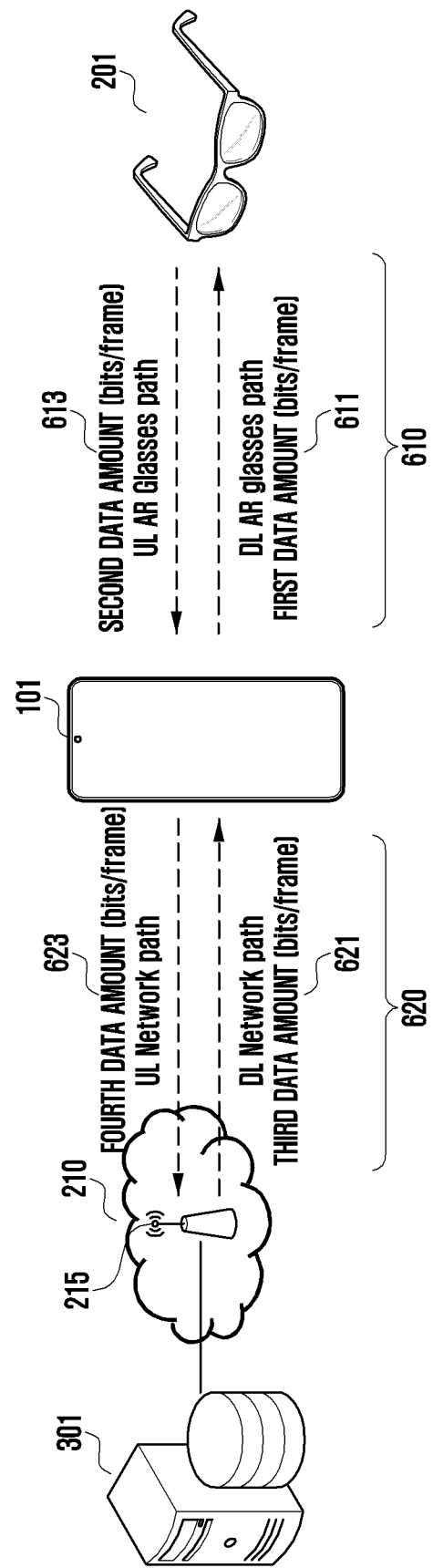
FIG. 6 illustrates an example of the operation in which the electronic device calculates the SP according to various embodiments.

FIG. 6 illustrates an example of the operation in which the electronic device calculates the SP according to various embodiments.

According to an embodiment, FIG. 6 illustrates an example of calculating a first SP related to a first link 610 between the electronic device 101 and the external device 201 and a second SP related to a second link 620 between the electronic device 101 and the first network 210 (for example, the AP 215).

Referring to FIG. 6, it may be assumed that an amount of data per frame for each link (For example, the first link 610 and the second link 620) is predetermined. For example, an amount of data per frame required for each link may be determined on the basis of an AR application or AR service being executed in the electronic device 101 and/or the external device 201. For example, the amount of data per frame required for each link (or a transmission requirement) may vary depending on a condition (for example, resolution or speed) required by the AR application or the AR service. According to an embodiment, a first data amount between the electronic device 101 and the external device 201 (for example, the first link 610) may indicate an amount of data per frame (for example, the number of data buts) (for example, bits/frame) required for a downlink (DL) 611 (for example, a DL path) in which the electronic device 101 transmits data to the external device 201. A second data amount between the electronic device 101 and the external device 201 (for example, the first link 610) may indicate an amount of data per frame required for an uplink 613 (for example, a UL path) in which the external device 201 transmits data to the electronic device 101. According to an embodiment, a third data amount between the electronic device 101 and the first network 210 (for example, the second link 620) may indicate an amount of data per frame required for a downlink (DL) 621 in which the electronic device 101 receives data from the first network 210 (for example, the AP 215). According to an embodiment, a fourth data amount between the electronic device 101 and the first network 210 (for example, the second link 620) may indicate an amount of data per frame required for an uplink (UL) 623 in which the electronic device 101 transmits data to the first network 210 (for example, the AP 215). According to an embodiment, the first data amount, the second data amount, the third data amount, and the fourth data amount may include a specific value which can be determined on the basis of a service and/or an application executed by the external device 201.

According to an embodiment, the electronic device 101 may determine SPs (for example, the first SP and the second SP) related to the respective links 610 and 620 on the basis of the data amounts for the respective links 610 and 620 and the bandwidths for the respective links 610 and 620 as shown in the following example.

$$SP = \frac{DL \text{ data amount} + UL \text{ data amount}}{\text{Link Bandwidth}} \quad \text{[Equation 1]}$$
$$= \frac{DL \text{ data amount}}{DL \text{ Bandwidth}} + \frac{UL \text{ data amount}}{UL \text{ Bandwidth}}$$

$$\text{First } SP = \frac{\text{first data amount} + \text{second data amount}}{\text{first Link Bandwidth}} \quad \text{[Equation 2]}$$
$$= \frac{\text{first data amount}}{DL \text{ Bandwidth}} + \frac{\text{second data amount}}{UL \text{ Bandwidth}}$$

$$\text{Second } SP = \frac{\text{third data amount} + \text{fourth data amount}}{\text{first Link Bandwidth}} \quad \text{[Equation 3]}$$
$$= \frac{\text{third data amount}}{DL \text{ Bandwidth}} + \frac{\text{fourth data amount}}{UL \text{ Bandwidth}}$$

As shown in [Equation 1], the electronic device 101 may determine that the SP is a value obtained by dividing the data amount for each link by a bandwidth of each link (for example, the first link 610 and the second link 620). According to an embodiment, the electronic device 101 may determine that the first SP between the electronic device 101 and the external device 201 is a value obtained by dividing a sum of data amounts (for example, the first data amount and the second data amount) of the downlink and the uplink between the electronic device 101 and the external device 201 by a bandwidth of the first link 610 (for example, a wireless link bandwidth) as shown in [Equation 2]. According to an embodiment, the electronic device 101 may determine that the second SP between the electronic device 101 and the first network 210 is a value obtained by dividing a sum of data amounts (for example, the third data amount and the fourth data amount) of the downlink and the uplink between the electronic device 101 and the first network 210 by a bandwidth of the second link 620 (for example, a network link bandwidth) as shown in [Equation 3]. According to an embodiment, the bandwidth for each link (for example, the wireless link bandwidth or the network link bandwidth) may be determined on the basis of at least a spatial stream used by the electronic device 101 and/or a Modulation and Coding Scheme (MCS) index (for example, MCS 11) designated to communication.

For example, the electronic device 101 may exchange a frame for the communication connection with the external device 201 and/or the AP 215, for example, an association request and an association response. The frame for the connection may include information on the standard which can be used for wireless communication, a channel bandwidth, and/or the maximum number of spatial streams. Further, the electronic device 101 may measure a signal quality of a received signal and may estimate, for example, a maximum modulation method which can be used in wireless communication, a channel coding rate, and/or a maximum MCS index by comparing a receiver minimum input level sensitivity value defined in each standard and a received signal quality. The maximum data rate defined in the standard may be calculated on the basis of the standard, the channel bandwidth, the maximum number of spatial streams, the maximum modulation method based on the received signal quality, the channel coding rate, and/or the maximum MCS index, and may be defined as a bandwidth of a link (for example, the first link 610) between the electronic device 101 and the external device 201 and a bandwidth of a link (for example, the second link 620) between the electronic device 101 and the AP 215 on the basis of the values.

According to an embodiment, when calculating the SP as shown in [Equation 1], the electronic device 101 may calculate the SP on the basis of the link bandwidth if link bandwidths of the UL path and the DL path are the same. According to some embodiments, if the link bandwidths of the UL path and the DL path are different when the SP is calculated, the electronic device 101 may calculate the SP by adding link bandwidths corresponding to the DL path and the UL path as shown in [Equation 2] and/or [Equation 3].

Figure 7:
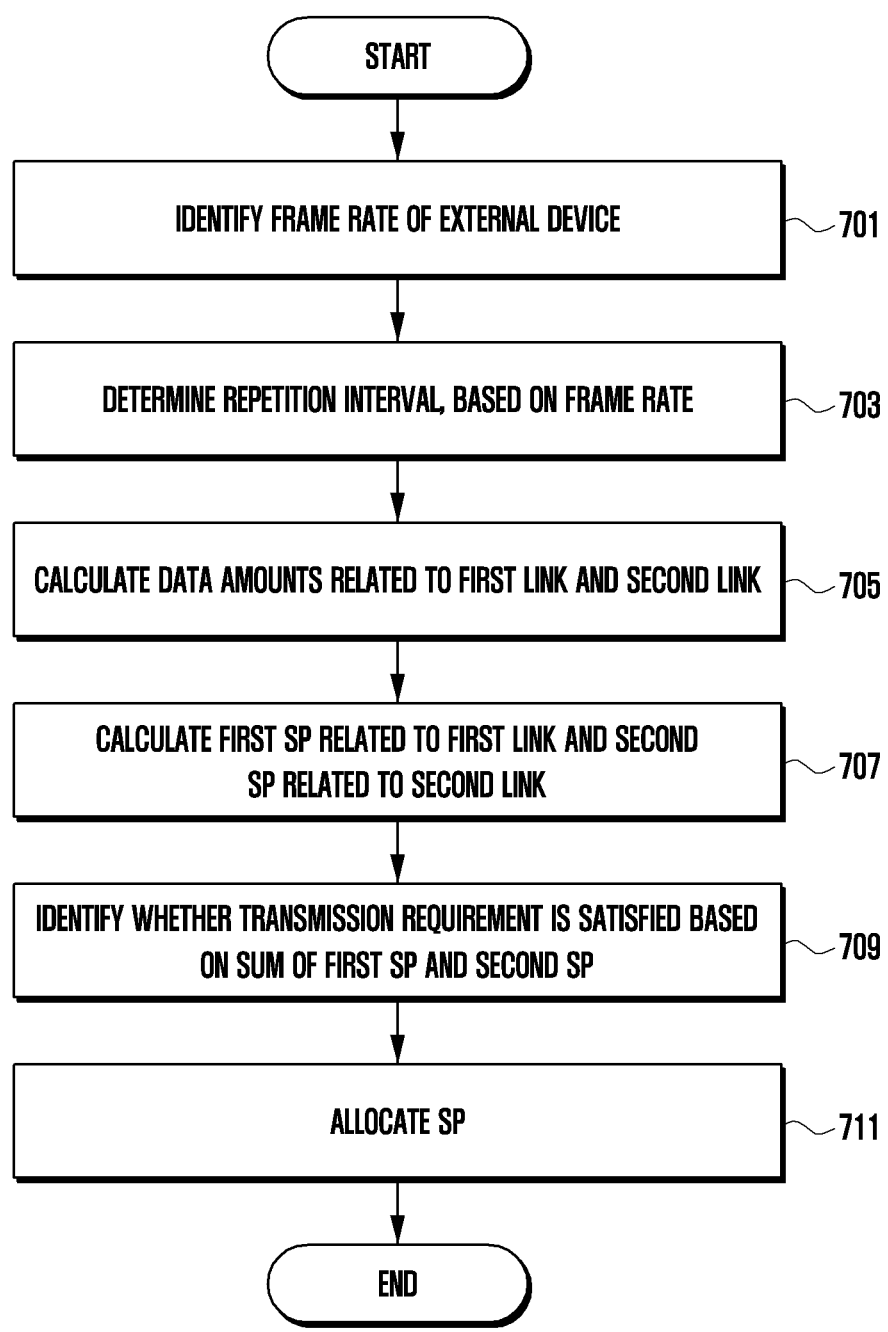
FIG. 7 is a flowchart illustrating a method of operating the electronic device according to various embodiments.
Figure 8:
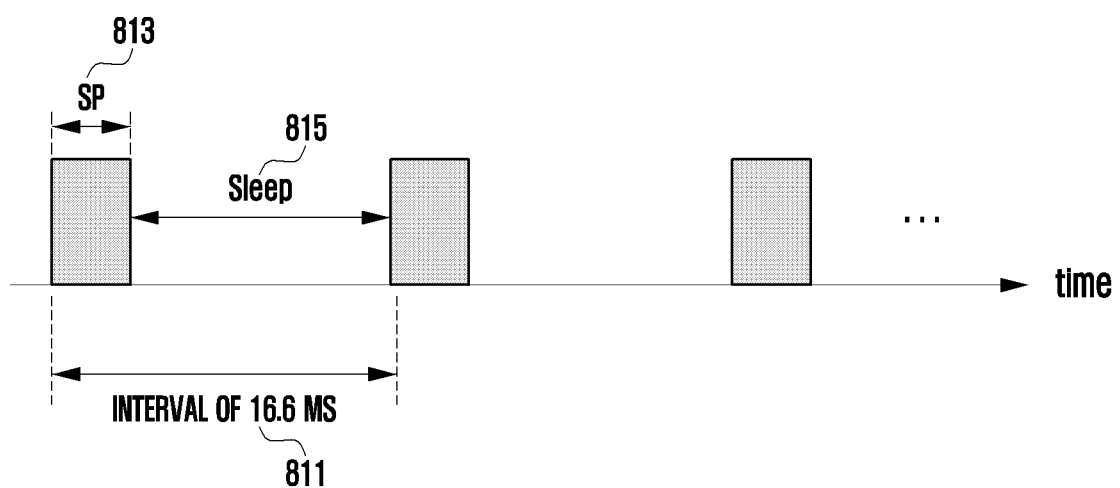
FIG. 8 illustrates an example in which the electronic device performs scheduling based on an SP and an interval according to various embodiments.

FIG. 7 is a flowchart illustrating a method of operating an electronic device according to various embodiments. FIG. 8 illustrates an example in which the electronic device performs scheduling based on the SP and the interval according to various embodiments.

According to various embodiments, when a network through which the electronic device 101 and the server 301 make the communication connection is the first network 210, the electronic device 101 may determine whether an image transmission requirement for transmission of an AR image to the external device 201 (for example, tethered AR glasses) is satisfied. According to an embodiment, the electronic device 101 may determine whether the image transmission requirement is satisfied on the basis of whether a sum of the first SP and the second SP calculated on the basis of [Equation 1] to [Equation 3] is included in the interval by the frame rate of the external device 201. For example, FIGS. 7 and 8 illustrate an example of determining the SP and the interval for determining whether the image transmission requirement is satisfied when the electronic device 101 uses the first network 210 as a network with the server 301.

Referring to FIG. 7, in operation 701, the processor 120 of the electronic device 101 may identify the frame rate for display of content as related to the external device 201. According to an embodiment, the processor 120 may search for the external device 201, to which connection can be made using OOB (for example, NFC, BLE, and/or Wi-Fi 2.4 GHz) communication. For example, the external device 201 may periodically perform a BLE advertisement (e.g., a connection request broadcast) and may include information indicating a device for supporting the AR service, information related to the frame rate of the external device 201, and information related to elements including the external device 201 (for example, a camera module and a sensor) in the BLE advertisement. According to an embodiment, the processor 120 may perform periodic BLE scan through the wireless communication circuit 310 and receive the BLE advertisement of the external device 201 on the basis of the BLE scan. According to an embodiment, the processor 120 may identify the frame rate of the external device 201 on the basis of information acquired through OOB communication with the external device 201.

In operation 703, the processor 120 may determine a repetition interval on the basis of the frame rate of the external device 201. For example, the processor 120 may determine an image frame transmission interval 811 on the basis of the frame rate of the external device 201 as illustrated in FIG. 8. According to an embodiment, the processor 120 may determine a first interval (for example, 33.3 ms) for a first frame rate (for example, 30 fps), a second interval (for example, 16.6 ms) for a second frame rate (for example, 60 fps), or a third interval (for example, 8.3 ms) for a third frame rate (for example, 120 fps). According to an embodiment, referring to FIG. 8, when it is assumed that the frame rate of the external device 201 is 60 frames per second (for example, 60 fps), data corresponding to one frame may be transmitted a minimum of every 16.6 ms in a wireless link section between the electronic device 101 and the external device 201. For example, in FIG. 8, data corresponding to a minimum of one frame may be transmitted and received every 16.6 ms during an SP 813 calculated on the basis of a data amount and may re-enter a sleep mode 815. According to an embodiment, the processor 120 may determine a time required for transmitting data of one frame according to a frame rate for an image, and a time for which data of one frame should be transmitted according to a frame rate for an image may be determined as illustrated in FIG. 8. For example, in the case of about 60 fps, a minimum of one image frame should be transmitted within about 16.6 ms. That is, in the case of 60 fps, an interval per frame may be about 16.6 ms.

In operation 705, the processor 120 may calculate a data amount related to the first link 610 (for example, the link between the electronic device 101 and the external device 201) and the second link 620 (for example, the link between the electronic device 101 and the AP 215). According to an embodiment, as described above, a data amount per frame required for each link (for example, the first link 610 or the second link 620) may be predetermined. For example, a data amount related to the first link 610 may include a data amount per frame (for example, bits/frame) required in the downlink (DL) in which the external device 201 receives data from the electronic device 101 and a data amount per frame required in the uplink (UL) in which the external device 201 transmits data to the electronic device 101. According to an embodiment, a data amount related to the second link 620 may include a data amount per frame required in the DL in which the electronic device 101 receives data from the first network 210 (for example, the AP 215) and a data amount per frame required in the UL in which the electronic device 101 transmits data to the first network 210 (for example, the AP 215). According to an embodiment, the data amount for each link may vary depending on a service and/or an application executed by the external device 201.

According to an embodiment, referring to FIG. 8, it may be assumed that the frame rate is 60 fps and the SP 813 is determined as 1 ms. For example, the SP 813 may be determined by a network bandwidth, a data amount per frame, and an allocation time for retransmission. For example, when the electronic device 101 and the external device 201 have the wireless connection in a bandwidth of 160 MHz with the WLAN standard based on IEEE 802.11ax and two spatial streams can be supported using a MIMO scheme (for example, when operation with a sufficiently good signal quality in a short range is assumed), a physical layer link speed of a maximum of 2400 Mbps may be provided. When it is assumed that the data frame is transmitted on the basis of a Transmission Control Protocol (TCP) and efficiency of TCP communication is 75% of the physical layer link speed, it may be assumed that a network bandwidth is 1800 Mbps (2400 Mbps*0.75). When it is assumed that an amount of data transmission of 1.8 Mbits is needed per frame transmitted from the electronic device 101 to the display device 201, the SP 813 (for example, a minimum service period) may be determined as 1 ms (1.8 Mbit/1800 Mbps).

In operation 707, the processor 120 may calculate the first SP related to the first link 610 and the second SP related to the second link 620. According to an embodiment, the processor 120 may calculate the first SP and the second SP in accordance with the description made with reference to [Equation 1] to [Equation 3]. For example, the processor 120 may determine the SP on the basis of each link data amount. According to an embodiment, the operation of determining the SP on the basis of the data amount and the operation of determining the interval on the basis of the frame rate are not limited to the order illustrated in FIG. 7, and may be inversely sequentially performed in the illustrated order, in parallel, or heuristically.

In operation 709, the processor 120 may identify whether the image transmission requirement is satisfied on the basis of the sum of the first SP and the second SP. According to an embodiment, the processor 120 may determine whether the current network (for example, the first network 210) satisfies the image transmission requirement on the basis of the determined image frame transmission interval and SP. For example, when the sum of the first SP and the second SP is included in a predetermined interval (for example, when the sum of the first SP and the second SP is smaller than the interval according to the frame rate of the external device 201), the processor 120 may identify that the corresponding link (for example, the AP 215 of the first network 210) satisfies the image transmission requirement. In another example, when the sum of the first SP and the second SP is not included in a predetermined interval, the processor 120 may identify that the corresponding link (for example, the AP 215 of the first network 210) does not satisfy the image transmission requirement.

In operation 711, the processor 120 may allocate the SP. According to an embodiment, when it is identified that the image transmission requirement is satisfied, the processor 120 may configure the SP to guarantee each required SP. For example, the processor 120 may negotiate each link (for example, the first link 610 between the electronic device 101 and the external device 201 or the second link 620 between the electronic device 101 and the AP 215) with the external device 201 and the AP 215 supporting the first network 210. According to an embodiment, the processor 120 may negotiate SP duration, an SP start time, and/or an SP interval for each link (for example, the first link 610 between the electronic device 101 and the external device 201 or the second link 620 between the electronic device 101 and the AP 215) based on the first network 210. For example, the electronic device 101 and the external device 201 may negotiate the SP duration, the SP start time, and/or the SP interval for the first link 610, and the electronic device 101 and the AP 215 may negotiate the SP duration, the SP start time, and/or the SP interval for the second link 620. According to an embodiment, the electronic device 101 may negotiate the second link 620 with the AP 215 on the basis of the result of the negotiation for the first link 610 with the external device 201.

According to various embodiments, when the calculated sum of the first SP and the second SP is included in the image frame transmission interval as described above, the electronic device 101 may determine that the corresponding network (for example, the AP 215 of the first network 210) satisfies the image transmission condition. According to another embodiment, when the sum of the first SP and the second SP is smaller than the image frame transmission interval according to the frame rate of the external device 201, the electronic device 101 may reserve an additional retransmission time in consideration of a ratio of each SP. For example, when values (for example, a sum) of the first SP, the first retransmission time, the second SP, and the second retransmission time are included in the image frame transmission interval in consideration of the reserved retransmission time, the electronic device 101 may determine that the corresponding network (for example, the AP 215 of the first network 210) satisfies the image transmission condition. An example thereof is illustrated in FIG. 9.

Figure 9:
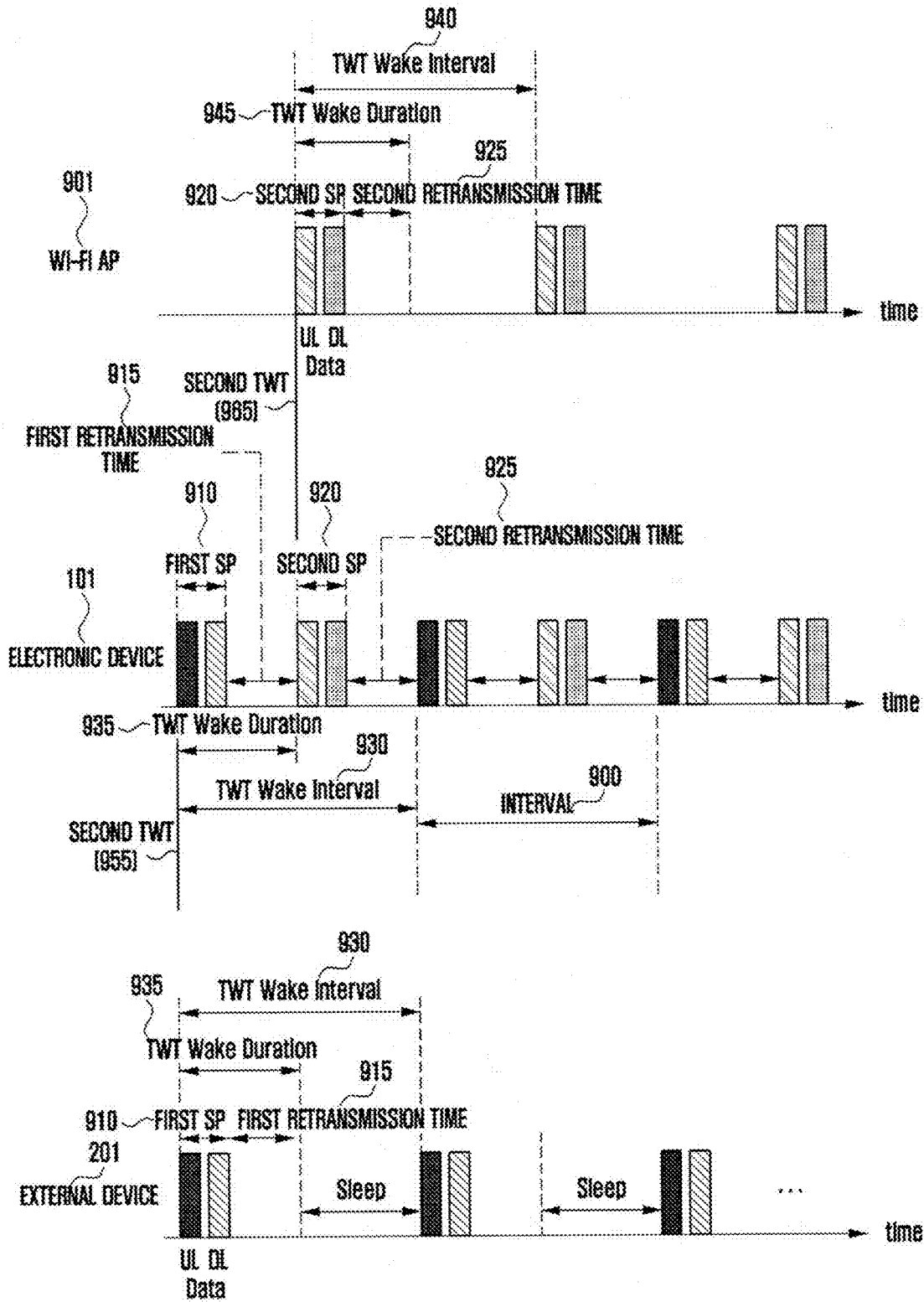
FIG. 9 illustrates an example of scheduling between links according to various embodiments.
Figure 10:
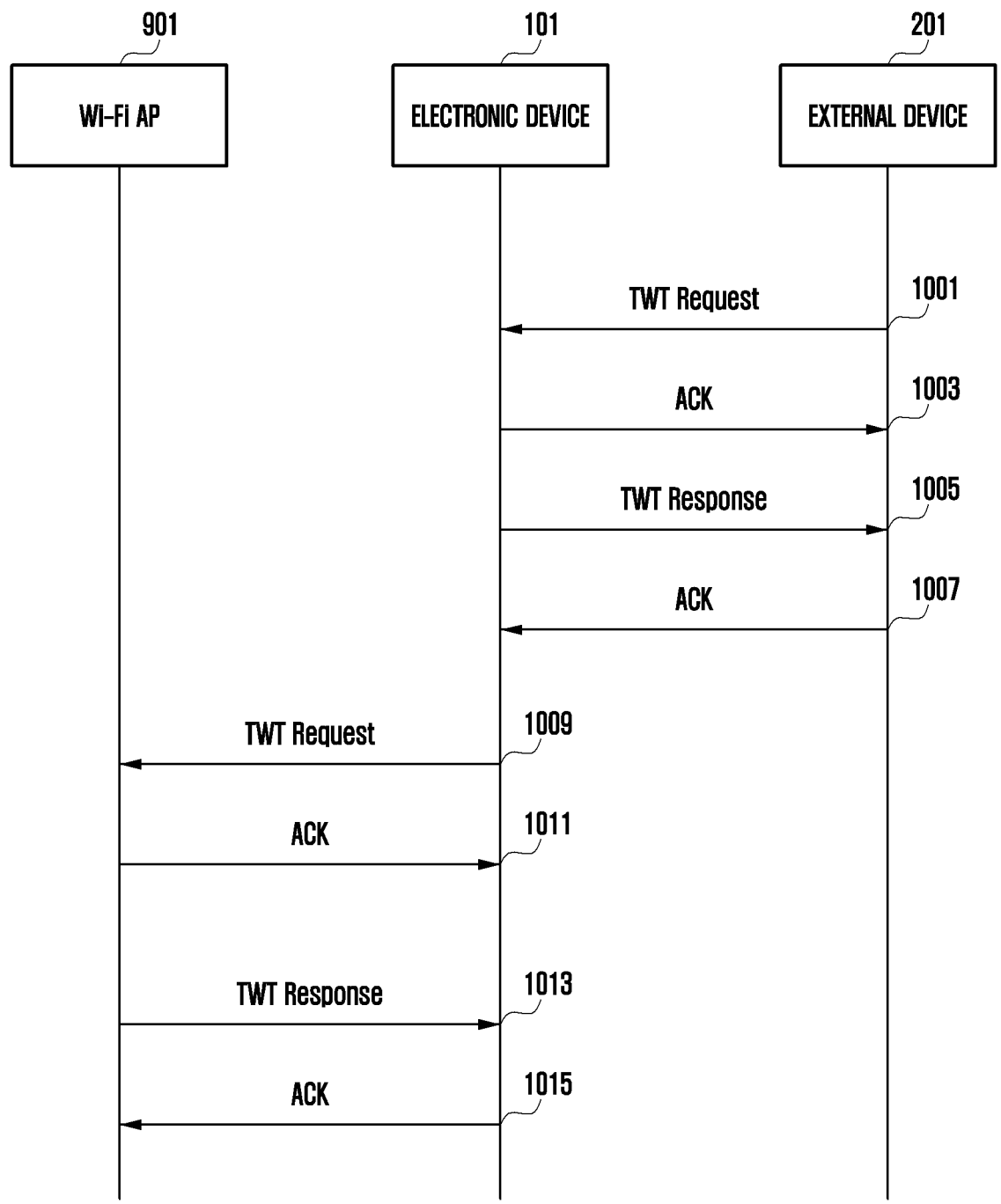
FIG. 10 illustrates an example of performing scheduling on the basis of a TWT protocol according to various embodiments.

FIG. 9 illustrates an example of scheduling between links according to various embodiments. FIG. 10 illustrates an example of performing scheduling on the basis of a TWT protocol according to various embodiments.

According to an embodiment, FIG. 9 illustrates an example of the control of sleep and wake up depending on the image frame transmission interval and the SP according to the frame rate between a Wi-Fi AP 901 (for example, the AP 215 of FIG. 2) of the first network 210, the electronic device 101, and the external device 201. According to an embodiment, FIG. 10 illustrates an example of the operation in which the electronic device 101 performs a TWT setup in the case in which the electronic device operates as a Target Wake Time (TWT) requesting station (hereinafter, referred to as a "TWT requesting STA") for the Wi-Fi AP 901 and the external device 201. According to an embodiment, in order to schedule a first SP 910 and a first retransmission time 915 of a first link (for example, the first link 610 of FIG. 6) between the electronic device 101 and the external device 201 and/or a second SP 920 and a second retransmission time 925 of a second link (for example, the second link 620 of FIG. 6) between the electronic device 101 and the Wi-Fi AP 901, for example, a method of performing scheduling on the basis of the TWT protocol as illustrated in FIG. 10 may be used.

Referring to FIG. 9, each link (for example, the first link and the second link) may be negotiated using a sleep/wake time protocol based on a TWT protocol defined in, for example, the 802.11ax standard and/or non-standard similar thereto in order to process the first SP 910 and the second SP 920 within a given interval. According to an embodiment, FIG. 9 illustrates an example in which the image transmission requirement is configured with the first SP 910 or the first retransmission time 915 of the first link between the electronic device 101 and the external device 201 of the first network 210 and the second SP 920 or the second retransmission time 925 of the second link between the electronic device 101 and the Wi-Fi AP 901 of the first network 210, for example, within an interval of about 16.6 ms at a frame rate of about 60 fps. According to an embodiment, in FIG. 9, the first retransmission time 915 and the second retransmission time 925 may be determined on the basis of the first SP 910 and the second SP 920. For example, when it is assumed that a retransmission rate is 100%, the first retransmission time 915 may be configured as a value which is the same as the first SP 910 and the second retransmission time 925 may be configured as a value which is the same as the second SP 920. For example, when the first SP 910 of the first link between the electronic device 101 and the external device 201 is 1 ms, the second SP 920, the first retransmission time 915, and/or the second retransmission time 925 may be configured as 1 ms.

According to an embodiment, FIGS. 9 and 10 illustrate an example in which the first SP 910 and the second SP 920 are configured not to overlap each other when the network is the first network 210 (for example, the Wi-Fi AP 901). According to an embodiment, when the type of the network between the server 301 and the electronic device 101 is the same (for example, the first network 210) as the type of the network between the electronic device 101 and the external device 201, transmission intervals are configured not to overlap each other.

For example, FIG. 10 illustrates an example of an operation (or configuration) in which the first SP 910 and the second SP 920 do not overlap each other when the electronic device 101 operates as a TWT requesting STA for the Wi-Fi AP 901 and the external device 201. For example, FIG. 10 illustrates an example in which the electronic device 101 operates as an STA and is connected to the Wi-Fi AP 901 and operates in a Group Client (GC) mode of a Wi-Fi Peer to Peer (P2P) group and is connected to the external device 201 operating in a Group Owner (OG) mode (or a soft AP mode) of a Wi-Fi P2P group.

Referring to FIGS. 9 and 10 according to an embodiment, in operation 1001, the external device 201 may transmit a TWT request to the electronic device 101. According to an embodiment, the external device 201 101 may configure a value corresponding to each of the fields for configuring a TWT wake interval (or target wake interval) 930, a TWT wake duration (or minimum wake duration) 935, and a first TWT 955 included in the TWT elements and make a request for controlling a network while transmitting a TWT request. For example, the external device 201 may configure the first TWT 955 on the basis of a start time (or service start time) of a first SP 910, configure the TWT wake duration 935 on the basis of the first SP 910 and a first retransmission time 915, configure the TWT wake interval 930 on the basis of an image frame transmission interval 900, and transmit the same to the electronic device 101. For example, as illustrated in FIG. 9, the external device 201 may use the image frame transmission interval 900 as the TWT wake interval 930 and use the first SP 910 or a sum of the first SP 910 and the first retransmission time 915 as the TWT wake duration 935. For example, the electronic device 101 may use the sum of the first SP 910 and the first retransmission time 915 as the TWT wake duration 935 in the TWT setup operation of the electronic device 101 and the external device 201.

In operation 1003, the electronic device 101 may receive a TWT request from the external device 201 and transmit acknowledge (ACK) for reception of the TWT request to the external device 201.

In operation 1005, the electronic device 101 may transmit a TWT response to the external device 201 in response to the TWT request from the external device 201. According to an embodiment, the external device 201 receiving the TWT response from the electronic device 101 may operate in a woken-up state during the TWT wake duration 935 configured in the TWT request. For example, the external device 201 may enter a sleep state after the first SP 910 and enter the woken-up state in the next TWT wake interval 930. According to an embodiment, the external device 201 may add (or configure) a start time at which the service starts in a TWT field of the TWT request.

In operation 1007, the external device 201 may receive the TWT response from the electronic device 101 and transmit ACK for reception of the TWT response to the electronic device 101.

According to an embodiment, the electronic device 101 and the external device 201 may determine the configuration of the TWT wake interval 930, the TWT wake duration 935, and the first TWT 955 included in TWT elements through the TWT negotiation. For example, when the external device 201 configures the TWT elements (for example, the TWT wake interval 930, the TWT wake duration 935, and the first TWT 955) and transmits the same to the electronic device 101, the electronic device 101 may approve the TWT request from the external device 201 on the basis of a busy degree of a channel and state information of the electronic device 101 or configure TWT elements which can be supported by the electronic device 101 and transmit the TWT elements to the external device 201 (for example, transmit a TWT response).

In operation 1009, the electronic device 101 may transmit the TWT request to the Wi-Fi AP 901. According to an embodiment, when the TWT request is transmitted, the electronic device 101 may configure a value corresponding to each of the fields for configuring the TWT wake interval 940, the TWT wake duration 945, and the second TWT 965 included in the TWT elements to control the network. For example, the electronic device 101 may configure the first TWT 955 (or TWT of the first link) on the basis of the start time (or service start time) of the first SP 910, the first SP 910, and the first retransmission time 915, configure the second TWT 965 (or TWT of the second link) on the basis of the second SP 920 and the second retransmission time 925, and configure the TWT wake interval 940 on the basis of the image frame transmission interval 900. According to an embodiment, the first TWT 955 and the second TWT 965 may be configured to have different values, and the electronic device 101 may control the first SP 910 and the second SP 920 to not overlap on the basis of a differentiated configuration of the first TWT 955 and the second TWT 965.

For example, as illustrated in FIG. 9, the electronic device 101 may use the image frame transmission interval 900 as the TWT wake interval 940 and use the second SP 920 or a sum of the second SP 920 and the second retransmission time 925 as the TWT wake duration 945. For example, the electronic device 101 may use the sum of the second SP 920 and the second retransmission time 925 as the TWT wake duration 945 in the TWT setup operation of the Wi-Fi AP 901 for the connection between the electronic device 101 and the server 301. According to some embodiments, the electronic device 101 may also use a time value considering the first SP 910 and the first retransmission time 915 of the external device 201 as the second TWT 965 in the TWT setup operation of the Wi-Fi AP 901. For example, the electronic device 101 may use a value obtained by adding the sum of the first SP 910 and the first retransmission time 915 to the first TWT 955 configured with the external device 201 as the second TWT 965 for the Wi-Fi AP 901. For example, the electronic device 101 may configure the second TWT 965 in consideration of the end of the first SP 910 or the first retransmission time 915.

In operation 1011, the Wi-Fi AP 901 may receive a TWT request from the electronic device 101 and transmit ACK for reception of the TWT request to the electronic device 101.

In operation 1013, the Wi-Fi AP 901 may transmit a TWT response to the electronic device 101 in response to the TWT request from the electronic device 101. According to an embodiment, the Wi-Fi AP 901 may transmit and receive data corresponding to third data 621 and fourth data (i.e., the uplink UL) 623 to and from the electronic device 101 in the period of the TWT wake duration 945 configured in the TWT request. According to an embodiment, the Wi-Fi AP 901 may determine the configuration of the TWT wake interval 940, the TWT wake duration 945, and the second TWT 965 included in TWT elements configured by the electronic device 101 through a negotiation. For example, the Wi-Fi AP 901 may identify whether SPs with at least one other electronic device (not shown) having a communication connection with the Wi-Fi AP 901 do not overlap.

In operation 1015, the electronic device 101 may receive the TWT response from the Wi-Fi AP 901 and transmit ACK for reception of the TWT response to the Wi-Fi AP 901.

As described above, according to various embodiments, the electronic device 101 may configure the TWT in the TWT setup operation of each link such that the first SP 910 and the second SP 920 do not overlap each other when the network is the first network 210.

According to an embodiment, the electronic device 101 may perform again the TWT configuration operation with the external device 201 on the basis of the TWT setup with the Wi-Fi AP 901. For example, when the electronic device 101 transmits a TWT request to the Wi-Fi AP 901 on the basis of the TWT configuration with the external device 201 and the Wi-Fi AP 901 makes a request for (or rejects) changing the TWT setup, the electronic device 101 may configure again some of the TWT setup (for example, the first TWT) with the external device 201 on the basis of the TWT configuration with the Wi-Fi AP 901.

Figure 11:
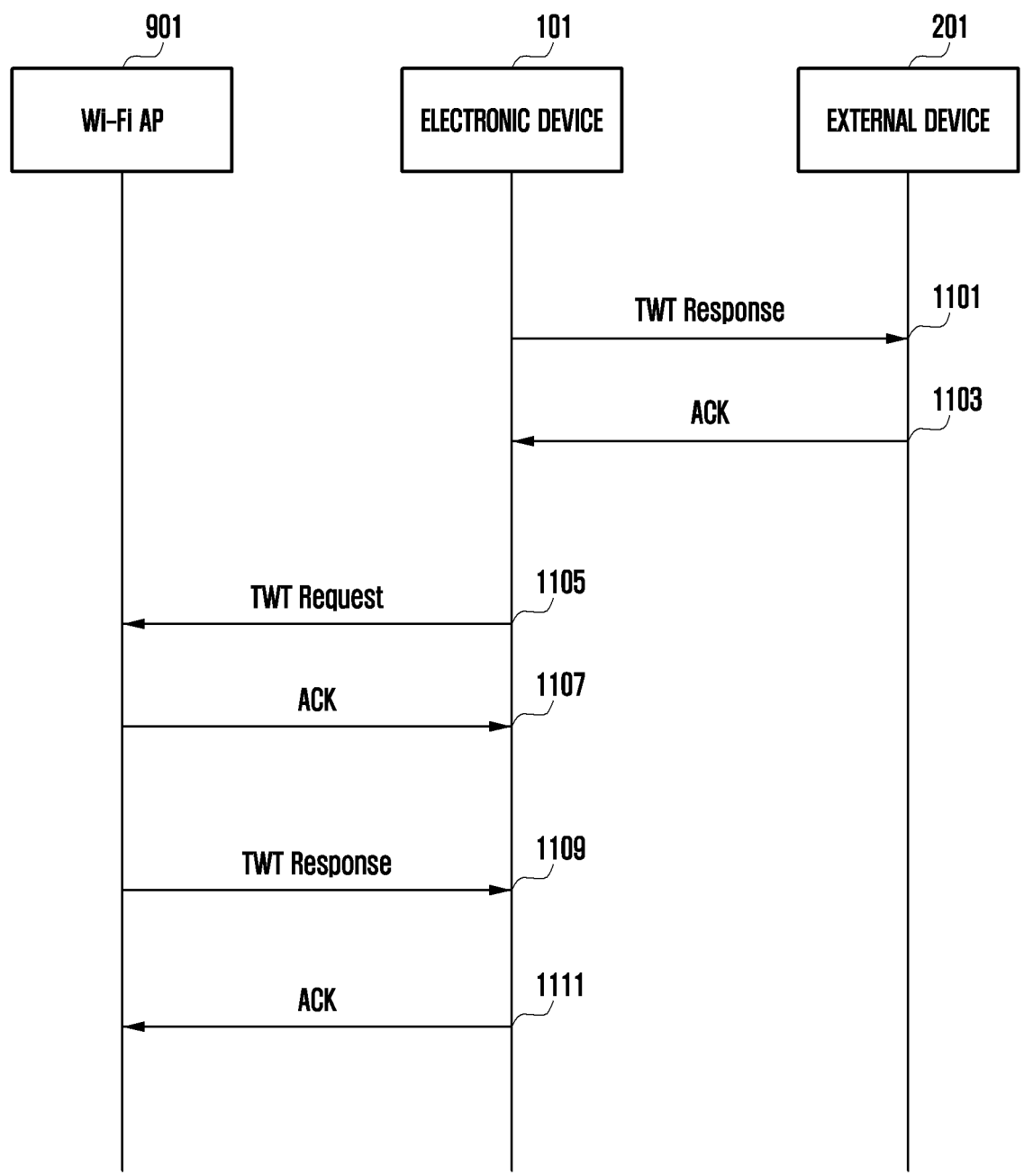
FIG. 11 illustrates another example of performing scheduling on the basis of a TWT protocol according to various embodiments.

FIG. 11 illustrates another example of performing scheduling on the basis of a TWT protocol according to various embodiments.

According to an embodiment, FIG. 11 illustrates an example of an operation in which the TWT setup is performed when the electronic device 101 operates as a TWT requesting STA for the Wi-Fi AP 901 and operates as a TWT responding STA for the external device 201.

According to an embodiment, FIG. 11 illustrates an example in which the first SP 910 and the second SP 920 are configured not to overlap each other when the network is the first network 210 (for example, the Wi-Fi AP 901). According to an embodiment, when the type of the network between the server 301 and the electronic device 101 is the same (for example, the first network 210) as the type of the network between the electronic device 101 and the external device 201, the SPs are configured not to overlap.

For example, FIG. 11 illustrates an example of an operation (or configuration) in which the first SP 910 and the second SP 920 do not overlap each other when the electronic device 101 operates as a TWT requesting STA for the Wi-Fi AP 901 and operates as a TWT responding STA for the external device 201. For example, FIG. 11 illustrates an example in which the electronic device 101 operates as an STA and is connected to the Wi-Fi AP 901 and operates in a GO mode (or a soft AP mode) of a Wi-Fi P2P group with the external device 201 and is connected to the external device 201 operating in a GC mode (or an STA mode) of a Wi-Fi P2P group.

As illustrated in FIG. 11, FIG. 11 is different from FIG. 10 in that the electronic device 101 performs a TWT setup with the external device 201 using a TWT response.

Referring to FIGS. 9 and 11 according to an embodiment, in operation 1101, the electronic device 101 may transmit a TWT response to the external device 201. According to an embodiment, the electronic device 101 may configure a value corresponding to each of the fields for configuring the TWT wake interval 930, the TWT wake duration 935, and the first TWT 955 included in the TWT elements and control the network while transmitting the TWT response. For example, the electronic device 101 may configure the first TWT 955 on the basis of a start time (or service start time) of the first SP 910, configure the TWT wake duration 935 on the basis of the first SP 910 and the first retransmission time 915, configure the TWT wake interval 930 on the basis of the image frame transmission interval 900, and transmit the same to the external device 201. For example, as illustrated in FIG. 9, the electronic device 101 may use the image frame transmission interval 900 as the TWT wake interval 930 and use the first SP 910 or a sum of the first SP 910 and the first retransmission time 915 as the TWT wake duration 935. For example, the electronic device 101 may use the sum of the first SP 910 and the first retransmission time 915 as the TWT wake duration 935 in the TWT setup operation of the electronic device 101 and the external device 201.

In operation 1103, the external device 201 may receive the TWT response from the electronic device 101 and transmit ACK for reception of the TWT response to the electronic device 101. According to an embodiment, as illustrated in FIG. 11, when the electronic device 101 operates in the GO mode of the Wi-Fi P2P group for the external device 201, the electronic device 101 may directly transmit the TWT response and directly perform the TWT setup operation for the Wi-Fi AP 901 on the basis of reception of ACK for reception of the TWT response from the external device 201. For example, when the electronic device 101 does not receive a TWT teardown from the external device 201 after transmitting the TWT response, the electronic device 101 may determine that the TWT setup with the external device 201 has been normally completed and perform the TWT setup operation for the Wi-Fi AP 901. According to an embodiment, when the external device 201 determines that TWT setup information (for example, the TWT wake interval 930, the TWT wake duration 935, and/or the first TWT 955) included in the TWT response received from the electronic device 101 does not satisfy the frame rate of the external device 201, the external device 201 may transmit the TWT teardown that ends the TWT setup. When the electronic device 101 does not receive the TWT teardown from the external device 201, the electronic device 101 may determine that the TWT setup with the external device 201 has been normally completed.

In operation 1105, operation 1107, operation 1109, and operation 1111, the electronic device 101 and the Wi-Fi AP 901 may perform operations corresponding to the description in operation 1009, operation 1011, operation 1013, and operation 1015 in FIG. 10.

Figure 12:
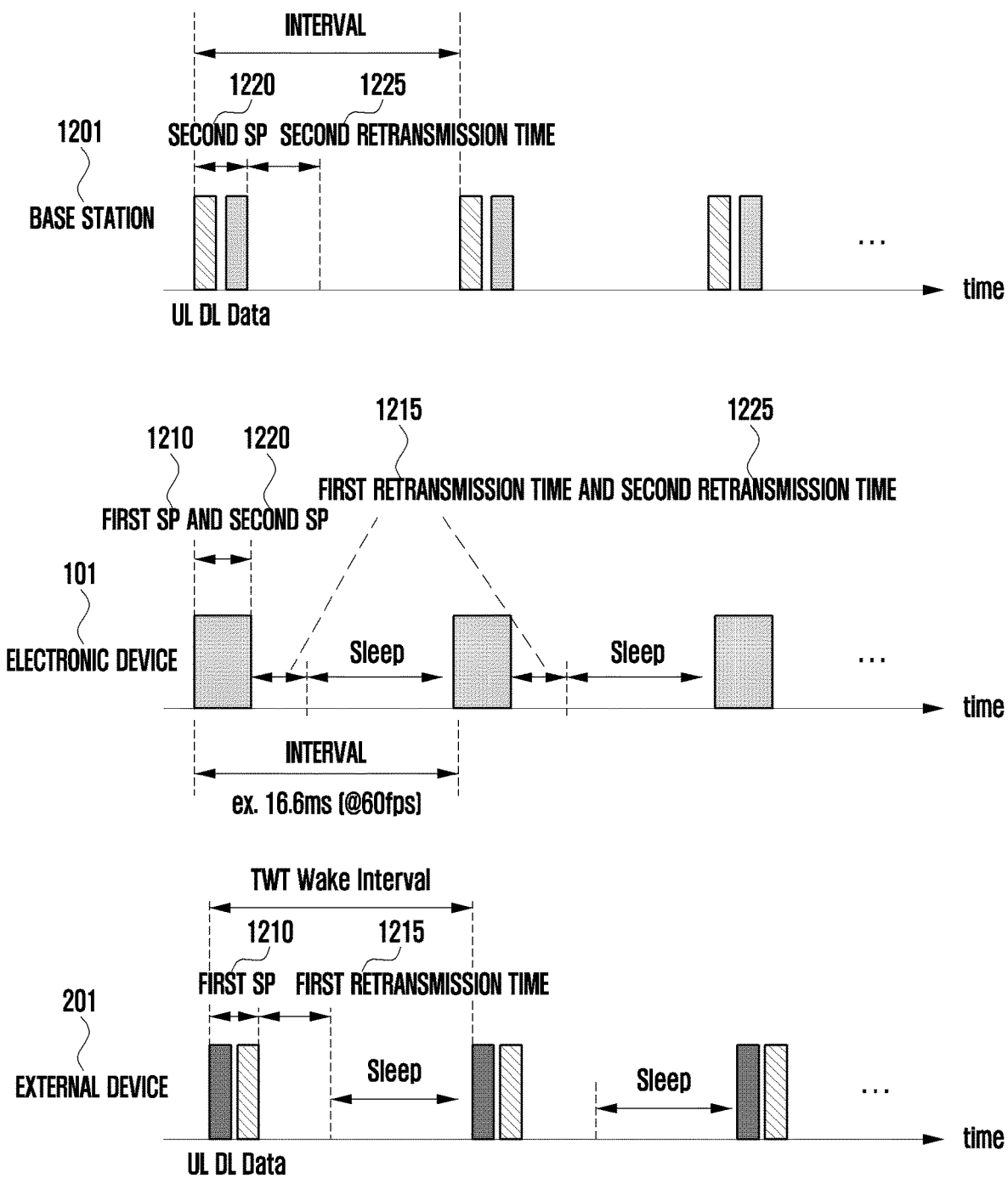
FIG. 12 illustrates another example of scheduling between links according to various embodiments.

FIG. 12 illustrates another example of scheduling between links according to various embodiments.

According to an embodiment, FIG. 12 illustrates an example in which sleep and wake-up are controlled according to an image frame transmission interval based on a frame rate and an SP between a base station 1201 (for example, the base station 225 of FIG. 2), of the second network 220, the electronic device 101, and the external device 201. According to an embodiment, FIG. 12 illustrates an example of an operation (or configuration) for overlapping a first SP 1210 and a second SP 1220 when a network connected to the electronic device 101 is the base station 1201 of the second network 220. According to an embodiment, when the type of the network (for example, the second network 220) between the server 301 and the electronic device 101 is different from the type of the network (for example, the first network 210) between the electronic device 101 and the external device 201, transmission intervals may be configured to overlap each other.

Referring to FIG. 12, the electronic device 101 may negotiate a TWT wake duration, a TWT wake interval, and an image frame transmission interval with the external device 201. According to an embodiment, in order to process the first SP 1210 and the second SP 1220 within a given interval, the electronic device 101 may perform a negotiation for each link using a TWT protocol defined in, for example, the 802.11ax standard or a sleep/wake time protocol based on the non-standard similar thereto. According to an embodiment, FIG. 12 illustrates an example in which an image transmission requirement is configured with the first SP 1210 and a first retransmission time 1215 between the electronic device 101 and the external device 201 of the first network 210 and/or the second SP 1220 and a second retransmission time 1225 between the base station 1201 and the electronic device 101 of the second network 220, for example, within an interval of about 16.6 ms at a frame rate of about 60 fps.

According to an embodiment, in order to schedule the first SP 1210, the first retransmission time 1215, the second SP 1220, and the second retransmission time 1225 between respective links, the electronic device 101 may use a method of performing scheduling on the basis of, for example, the TWT protocol as illustrated in FIG. 10 or 11.

According to an embodiment, FIG. 12 illustrates an example in which the first SP 1210 and the second SP 1220 are configured to at least partially overlap (or superimpose) each other when the network is the second network 220 (for example, a cellular base station 1201). For example, as illustrated in FIG. 12, when the network is the second network 220, the second SP 1220 and the second retransmission time 1225 may be at least partially the same as the first SP 1210 and the second retransmission time 1225 unlike in the case in which the network is the first network 210.

According to an embodiment, the electronic device 101 and the external device 201 may communicate with each other using a WLAN protocol, and the electronic device 101 and the server 301 may communicate with each other through the second network 220 (for example, the cellular base station 1201), and thus there may be no interference even though the first SP 1210 and the second SP 1220 are used at the same time. According to an embodiment, the electronic device 101 may switch to a wake-up state and transmit and receive data to and from the external device 201 through the first network 210 and transmit and receive data to and from the server 301 (or the cellular base station 1201) through the second network 220. For example, when transmission and reception of both links normally end, the electronic device 101 may enter the sleep mode and thus have a gain in current consumption.

Figure 13:
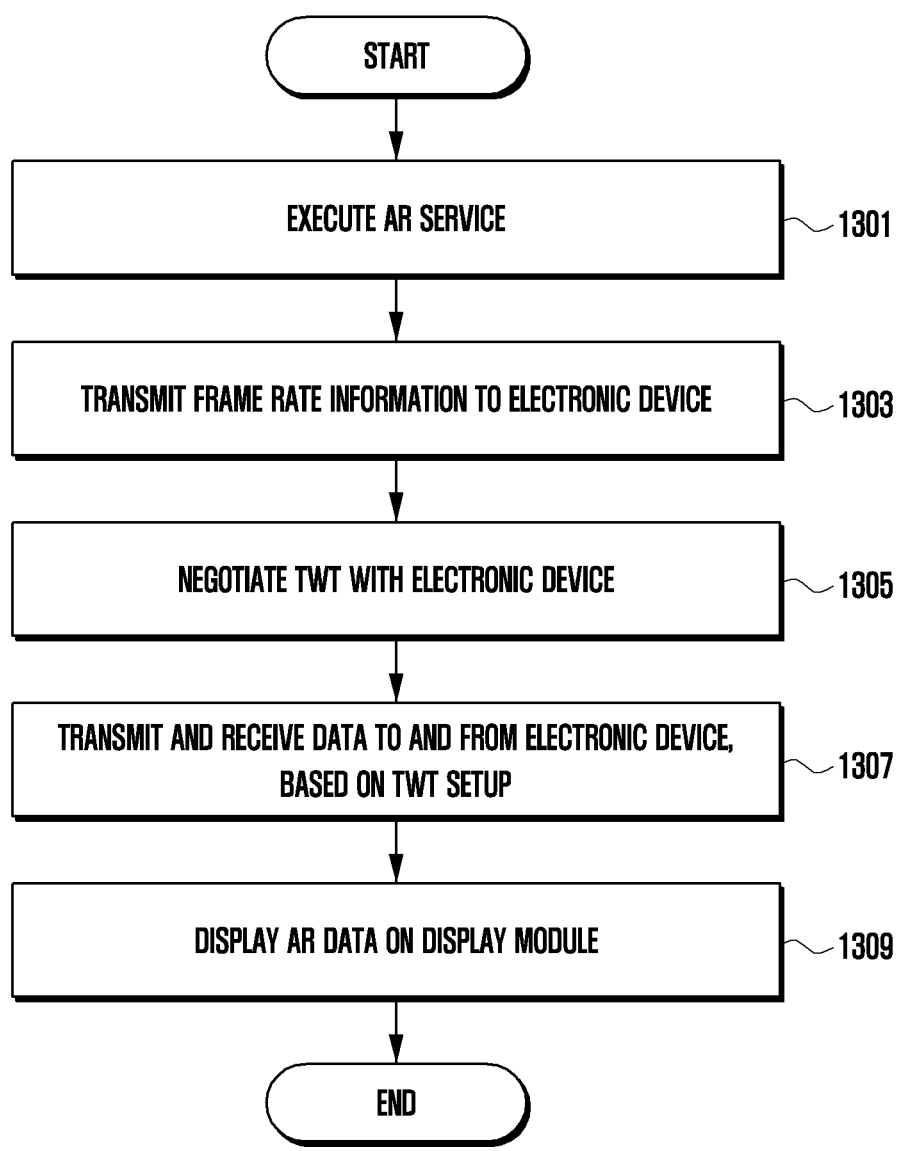
FIG. 13 is a flowchart illustrating an operation of the external device according to various embodiments.

FIG. 13 is a flowchart illustrating an operation of an external device according to various embodiments.

According to an embodiment, FIG. 13 illustrates an example in which the external device 201 provides an AR service on the basis of TWT negotiation with the electronic device 101.

Referring to FIG. 13, in operation 1301, the processor 380 of the external device 201 may execute the AR service. According to an embodiment, the processor 380 may execute the AR service (or an AR application related to the AR service) in the external device 201 on the basis of a request from the user or the electronic device 101. According to an embodiment, when executing the AR service, the processor 380 may detect the electronic device 101 which can be connected through OOB communication. For example, the processor 380 may detect the electronic device 101 through BLE as the OOB and make the connection with the electronic device 101 through a specific channel (for example, a WLAN channel) using a Wi-Fi direct protocol.

In operation 1303, the processor 380 may transmit frame rate information of the external device 201 to the electronic device 101 through the communication module 365 on the basis of the execution of the AR service. According to an embodiment, the processor 380 may transmit the frame rate information to the electronic device 101 after the operation of detecting the electronic device 101 through the OOB communication before the connection with the electronic device 101 or after the connection with the electronic device 101.

In operation 1305, the processor 380 may perform a TWT negotiation with the electronic device 101. According to an embodiment, the processor 380 may perform the TWT negotiation with the electronic device 101 in accordance with the description made with reference to FIG. 10 and/or FIG. 11.

In operation 1307, the processor 380 may transceive data to and from the electronic device 101 based on the TWT configuration. According to an embodiment, the processor 120 may transmit data (for example, image information captured by the camera module 360) to the electronic device 101 on the basis of a TWT parameter.

In operation 1309, the processor 120 may display AR data (e.g., AR images) through the display module 340. According to an embodiment, the processor 120 may receive the AR images from the electronic device 101 through the communication module 365 and display the received AR images through the display module 340.

Figure 14:
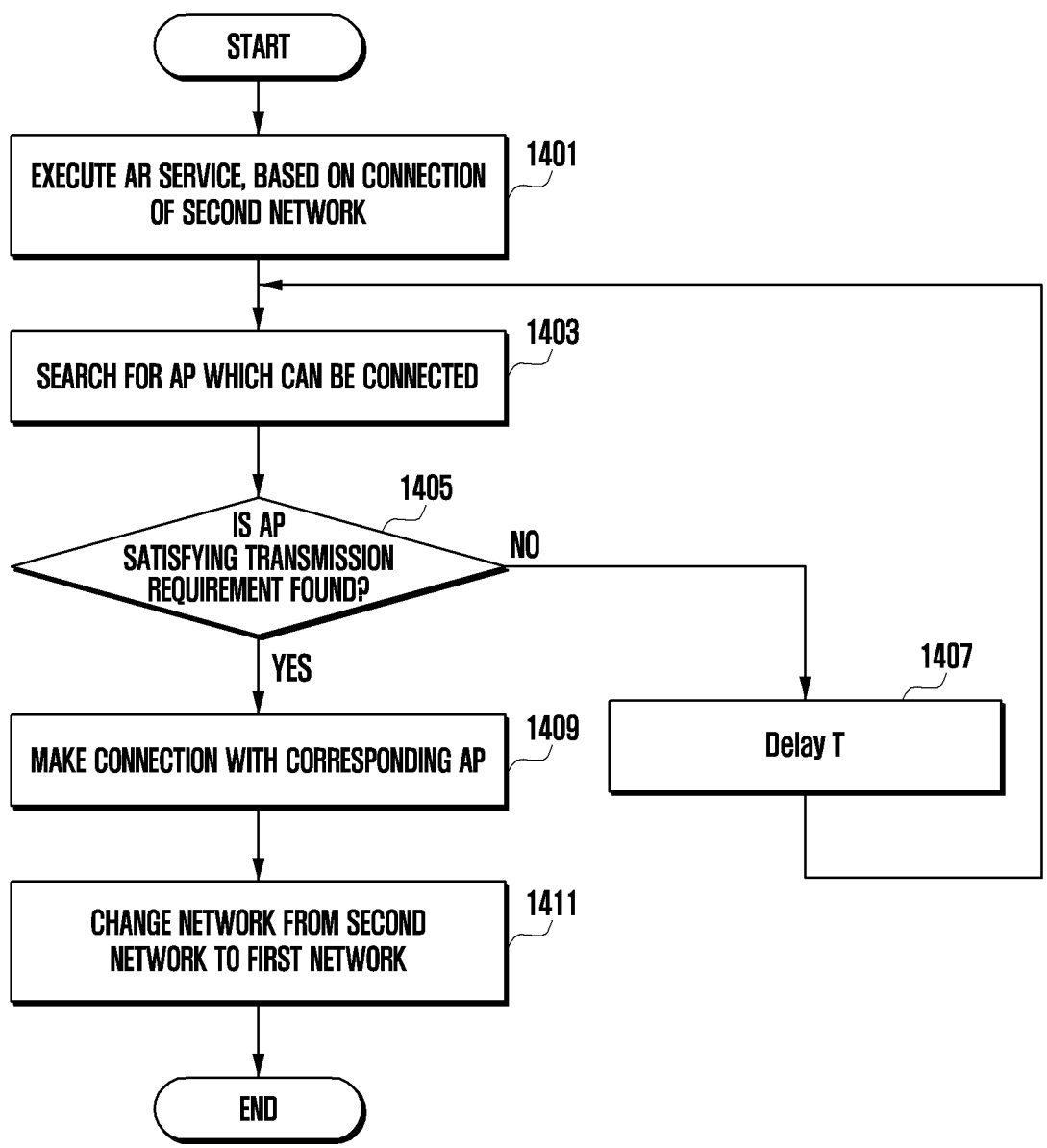
FIG. 14 is a flowchart illustrating an operation of the electronic device according to various embodiments.

FIG. 14 is a flowchart illustrating an operation of an electronic device according to various embodiments.

According to an embodiment, FIG. 14 illustrates an example in which the network is changed from the second network 220 to the first network 210 (for example, a Wi-Fi network) when the network currently connected to the electronic device 101 is the second network 220 (for example, a cellular network).

Referring to FIG. 14, in operation 1401, the processor 120 of the electronic device 101 may execute an AR service on the basis of the connection of the second network 220. For example, the electronic device 101 may execute the AR service while having a communication connection with the external device 201 on the basis of the first network 210 and a communication connection with the server 301 through the second network 220.

In operation 1403, the processor 120 may search for an AP (for example, the AP 215 of FIG. 2) of the first network 210 to which a connection may be established (or roamed) during the AR service based on the second network 220. According to an embodiment, when the electronic device 101 performs data communication related to the AR service on the basis of the second network 220, the electronic device may periodically monitor the first network 210 and perform an operation of searching for the first network 210 (for example, a Wi-Fi AP) which can be connected or roamed on the basis of the monitoring result. For example, the operation of searching for the AP of the first network 210 which can be connected (or roamed) during the AR service based on the second network 220 may be performed on the basis of a user request or a priority of the first network 210 being configured to be higher than the second network 220.

In operation 1405, the processor 120 may identify whether an AP which satisfies a transmission requirement is found, based on the search result. According to an embodiment, when the AP is found on the basis of the AP searching result, the processor 120 may determine whether the found AP satisfies the transmission requirement. For example, the processor 120 may determine whether the found AP satisfies the image transmission requirement that considers a first SP and a second SP, and/or a first retransmission time and a second retransmission time. According to an embodiment, the electronic device 101 may calculate the first SP and the first retransmission time on the basis of a frame rate of the external device 201 and determine whether the found AP supports the second SP and the second retransmission time on the basis of the first SP and the first retransmission time (whether a sum of the first SP, the second SP, the first retransmission time, and the second retransmission time is shorter than an interval according to the frame rate of the external device 201).

When no AP is discovered that satisfies the transmission requirement (for example, "No" of operation 1405), the processor 120 may initiate a delay for a predetermined time (for example, T, where T>0) in operation 1407, and return to operation 1403 to re-execute a search for a suitable AP.

When an AP satisfying the transmission requirement is found (for example, "Yes" of operation 1405), the processor 120 may establish a connection (or roaming) with the corresponding AP in operation 1409.

After the connection (or roaming) is established with the corresponding AP, the network for the AR service may be changed from the second network 220 to the first network 210 (e.g., or the data path may be changed, or example, from the second data path 240 to the first data path 230) in operation 1411. According to an embodiment, when the network is changed to the first network 210, the processor 120 may provide the AR service on the basis of scheduling that considers the first SP and the second SP, and/or the first retransmission time and the second retransmission time. For example, the processor 120 may perform scheduling such that the first SP and/or the first retransmission time and the second SP and/or the second retransmission time at least partially overlap each other.

Figure 15:
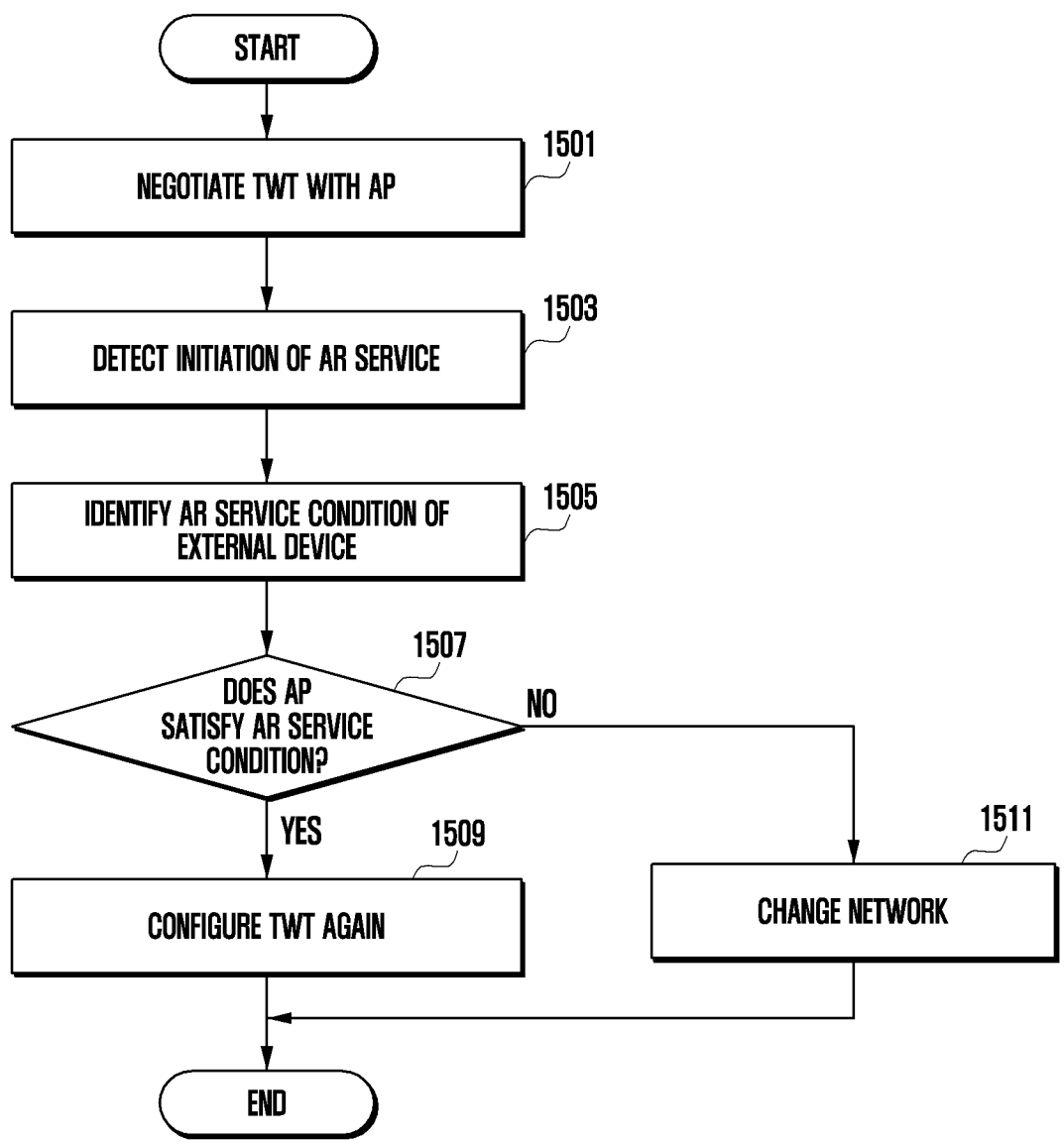
FIG. 15 is a flowchart illustrating an operation of the electronic device according to various embodiments.

FIG. 15 is a flowchart illustrating an operation of an electronic device according to various embodiments.

According to an embodiment, it may be assumed that the electronic device 101 is being communication-connected with the AP 215 supporting the first network 210 and a TWT configuration between the AP 215 and the electronic device 101 has been made on the basis of another application (or service) being executed in the electronic device 101 in FIG. 15. According to an embodiment, in the state of FIG. 15, the electronic device 101 may search for the external device 201 (or receive an AR service request from the external device 201) through the OOB, make a new TWT configuration with the AP 215 on the basis of an AR service condition (or a transmission requirement (for example, a frame rate)) of the external device 201, or change the first network 210 connected with the electronic device 101 through the AP 215 to the second network 220 including the base station 225.

Referring to FIG. 15, in operation 1501, the processor 120 of the electronic device 101 may execute a TWT negotiation with the AP 215 supporting the first network 210. According to an embodiment, the processor 120 may execute the TWT negotiation with the AP 215 (for example, a Wi-Fi AP 901 of FIG. 10 or 11) in accordance with the description made with reference to FIG. 10 and/or FIG. 11.

In operation 1503, the processor 120 may detect initiation of the AR service while the electronic device 101 is connected with the AP 215. According to an embodiment, the processor 120 may detect initiation of the AR service based on execution of an application (for example, an AR application) related to the AR service in the electronic device 101, and/or detection of a request for the connection with the external device 201. For example, in the state in which the electronic device 101 is being communication-connected with the AP 215 on the basis of the first network 210, the processor 120 may make the communication connection with the external device 201 through the first network 210 and execute the AR service.

In operation 1505, the processor 120 may identify the AR service condition (e.g., the transmission requirements, such as a frame rate) of the external device 201. According to an embodiment, the processor 120 may receive information on the frame rate of the external device 201 through OOB communication and identify the information on the frame rate of the external device 201 related to the AR service on the basis of a connection history.

In operation 1507, the processor 120 may determine whether the AP 215 satisfies the AR service condition based on the AR service condition. According to an embodiment, the processor 120 may determine whether the first network 210 currently connected between the electronic device 101 and the AP 215 satisfies the AR service condition, and is thus capable of providing transmission capability for a satisfactory AR experience. According to an embodiment, the first network 210 currently connected between the electronic device 101 and the AP 215 may be the communication connection between the electronic device 101 and the server 301 through the AP 215 supporting the first network 210.

When the AP 215 satisfies the AR service condition (for example, "Yes" of operation 1507), the processor 120 may reconfigure the TWT in operation 1509. For example, the processor 120 may perform again the TWT configuration operation with the electronic device 101 on the basis of the TWT configuration with the external device 201. According to an embodiment, the processor 120 may make a plurality of TWT configurations with the AP 215 on the basis of the application (or service) being executed in the electronic device 101. For example, a plurality of TWTs may be included between the electronic device 101 and the AP 215. According to an embodiment, in the state in which the TWT configuration is made with the AP 215, the processor 120 may configure a first AP with the external device 201 and a second SP with the AP 215 in consideration of the existing TWT on the basis of the application (for example, AR service) additionally executed in the electronic device 101. According to an embodiment, the processor 120 may provide the AR service on the basis of scheduling that considers the first SP and the second SP, and/or a first retransmission time and a second retransmission time. For example, the processor 120 may perform scheduling such that the first SP and/or the first retransmission time and the second SP and/or the second retransmission time at least partially overlap each other.

When the AP 215 does not satisfy the AR service condition (for example, "No" of operation 1507), the processor 120 may change the network to another network in operation 1511. According to an embodiment, the processor 120 may change the network for the AR service from the first network 210 to the second network 220 including the base station 225. For example, when the AR service has a high priority, the processor 120 may change the network for the connection between the electronic device 101 and the AP 215 from the first network 210 to the second network 220 to provide the AR service.

According to various embodiments, the external device 201 may include a rollable, foldable, or slidable display (for example, the display module 160 of FIG. 1). The external device 201 may have a different required data amount per frame on the basis of a display state (for example, at least a part is folded, rolled, or unfolded). For example, the data amount per frame required by the external device 201 may vary depending on a resolution of the display. According to an embodiment, the external device 201 may negotiate again the TWT wake duration, the TWT wake interval, and the image frame transmission interval with the electronic device 101 on the basis of the change in the display state.

An operation method performed by the electronic device 101 according to various embodiments of the disclosure may include an operation of identifying a first Service Period (SP) on the basis of a data amount of a predetermined data path when initiating an Augmented Reality (AR) service with the external device 201; an operation of identifying a transmission interval on the basis of a frame rate of the external device 201; an operation of identifying whether a network connected to the electronic device 101 satisfies a predetermined transmission requirement on the basis of at least the first SP and the transmission interval; an operation of determining connection information related to a connection with the external device 201 on the basis of the network satisfying the transmission requirement; and an operation of establishing the connection with the external device 201 on the basis of the connection information.

According to various embodiments of the disclosure, the operation of identifying the first SP may include an operation of configuring a first Target Wake Time (TWT) related to the first link on the basis of a TWT element of the first link between the electronic device 101 and the external device 201 and an operation of configuring a second TWT related to the second link between the electronic device 101 and the network on the basis of at least the first TWT and the TWT element of the first link, and the TWT element may include a TWT wake interval, a TWT wake duration, and a TWT.

According to various embodiments of the disclosure, the operation performed by the electronic device 101 may include an operation of calculating the first SP on the basis of a data amount of the first link and an operation of calculating a second SP on the basis of a data amount of the second link.

According to various embodiments of the disclosure, the operation of identifying whether the network satisfies the transmission requirement may include an operation of determining that the network satisfies the transmission requirement when a sum of the first SP and the second SP is included within a transmission interval according to the frame rate.

According to various embodiments of the disclosure, the first SP may include a required time calculated by dividing a data amount required for transmission of one frame in the first link between the electronic device and the external device by a link bandwidth of the first link.

According to various embodiments of the disclosure, the second SP may include a required time calculated by dividing a data amount required for transmission of one frame in the second link between the electronic device and the network by a link bandwidth of the second link.

According to various embodiments of the disclosure, the operation of determining the connection information may include an operation of determining that a channel through which the electronic device 101 is connected to the network is a channel between the electronic device 101 and the external device 201.

Various embodiments of the disclosure illustrated in the specification and drawings only present specific examples to easily describe the technical content of the disclosure and help understanding of the disclosure but do not limit the scope of the disclosure. Accordingly, the scope of the disclosure should be construed such that all modifications or modified forms derived based on the technical idea of the disclosure are included in the scope of the disclosure.

The invention claimed is:

1. An electronic device, comprising:
a wireless communication circuit; and
a processor operatively connected to the wireless communication circuit,
wherein the processor is configured to:
identify a first Service Period (SP), based on a data amount of a predetermined data path when an Augmented Reality (AR) service associated with an external device is initiated,
identify a transmission interval, based on a frame rate of display on the external device,
detect whether a network connected to the electronic device satisfies a predetermined transmission requirement, based on at least the first SP and the transmission interval,
based on detecting that the network satisfies the predetermined transmission requirement, determine connection information related to a connection with the external device, and
establish the connection with the external device based on the connection information.

2. The electronic device of claim 1, wherein the processor is configured to:
configure a first Target Wake Time (TWT) related to a first link, based on a TWT element of the first link between the electronic device and the external device, and
configure a second TWT related to a second link between the electronic device and the network, based on at least the first TWT and the TWT element of the first link, and
wherein the TWT element includes a TWT wake interval, a TWT wake duration, and a TWT.

3. The electronic device of claim 2, wherein the processor is configured to:
calculate the first SP, based on a data amount of the first link,
calculate a second SP, based on a data amount of the second link, and
determine that the network satisfies the predetermined transmission requirement when a sum of the first SP and the second SP is included in a transmission interval according to the frame rate.

4. The electronic device of claim 3,
wherein the first SP includes a first time calculated by:
dividing a data amount used to transmit one frame over the first link between the electronic device and the external device, by a link bandwidth of the first link, and
wherein the second SP includes a second time calculated by:
dividing a data amount used to transmit one frame over the second link between the electronic device and the network by a link bandwidth of the second link.

5. The electronic device of claim 1, wherein the processor is configured to determine whether to change the network, based on detecting whether the network satisfies the predetermined transmission requirement.

6. The electronic device of claim 5, wherein the processor is configured to:
search for another AP supporting the first network when the network is an Access Point (AP) supporting the first network and the AP does not satisfy the transmission requirement, and
change the network from the first network to the second network when the search for another AP satisfying the transmission requirement fails,
wherein an AP in a predetermined band is preferentially searched for when another AP is searched for.

7. The electronic device of claim 2, wherein the processor is configured to:
determine a network satisfying the transmission requirement,
determine connection information related to a connection with the external device, based on the determined network, and
transmit the determined connection information to the external device using Out Of Band (OOB) communication.

8. The electronic device of claim 7, wherein the processor is configured to:
determine that a channel by which the electronic device is connected with the network is a channel between the electronic device and the external device,
determine that a first channel equal to a channel configured with network is indicated by the connection information when the determined network is a first network, and
determine that a second channel different from the first channel is indicated by the connection information when the determined network is a second network.

9. The electronic device of claim 8, wherein the processor is configured to determine the connection information, based on a channel busy degree of the first network when the network is the first network.

10. The electronic device of claim 9, wherein the processor is configured to preferentially measure the channel busy degree, based on a channel in a predetermined band in the first network and determine that a channel having a low channel busy degree is a channel for a connection with the external device, based on a result of the measurement.

11. The electronic device of claim 3, wherein the processor is configured to:
determine whether the first SP and the second SP overlap, based on whether network types of the first link and the second link are equivalent,
set the first SP and the second SP to avoid overlap when the network types of the first link and the second link are equivalent, and
control the first SP and the second SP to at least partially overlap when the network types of the first link and the second link are different from each other.

12. An electronic device, comprising:
a wireless communication circuit; and
a processor,
wherein the processor is configured to:
detect a connection with an external device through the wireless communication circuit,
acquire a data amount of a first link between the electronic device and the external device and a data amount of a second link between the electronic device and a network,
calculate a first Service Period (SP) for the first link, based on the data amount of the first link,
calculate a second SP of the second link, based on the data amount of the second link,
determine a network satisfying an image transmission requirement, based on the first SP and the second SP, and
establish a connection with the external device by configuring a channel of the first link to be equal to a channel of the second link, based on the determined network.

13. A method of operating an electronic device, the method comprising:
identifying, by at least one processor of the electronic device, a first Service Period (SP), based on a data amount of a predetermined data path, when initiating an Augmented Reality (AR) service with an external device;
identifying a transmission interval, based on a frame rate for display of images on the external device;
identifying whether a network connected to the electronic device satisfies a predetermined transmission requirement, based on at least the first SP and the transmission interval;
determining connection information for connection with the external device, based on the network satisfying the predetermined transmission requirement; and
establishing the connection with the external device, based on the connection information.

14. The method of claim 13, wherein the identifying of the first SP comprises:
configuring a first Target Wake Time (TWT) related to a first link, based on a TWT element of the first link between the electronic device and the external device; and
configuring a second TWT related to a second link between the electronic device and the network, based on at least the first TWT and the TWT element of the first link, and
the TWT element includes a TWT wake interval, a TWT wake duration, and a TWT.

15. The method of claim 14, further comprising:
calculating the first SP, based on the data amount of the first link; and
calculating the second SP, based on the data amount of the second link, and
wherein the identifying of whether the network satisfies the transmission requirement comprises determining that the network satisfies the transmission requirement when a sum of the first SP and the second SP is included within a transmission interval according to the frame rate, wherein the first SP includes a first time calculated by:
dividing a data amount used to transmit one frame over the first link between the electronic device and the external device by a link bandwidth of the first link, and
wherein the second SP includes a second time calculated by:
dividing a data amount used to transmit one frame over the second link between the electronic device and the network by a link bandwidth of the second link.

* * * * *